US006781990B1

(12) United States Patent
Puri et al.

(10) Patent No.: US 6,781,990 B1
(45) Date of Patent: Aug. 24, 2004

(54) METHOD AND SYSTEM FOR MANAGING TRAFFIC IN A PACKET NETWORK ENVIRONMENT

(75) Inventors: Rahoul Puri, Los Altos, CA (US); Todd E. Wayne, Santa Cruz, CA (US)

(73) Assignee: Extreme Networks, Santa Clara, CA (US)

( * ) Notice: Subject to any disclaimer, the term of this patent is extended or adjusted under 35 U.S.C. 154(b) by 351 days.

(21) Appl. No.: 10/073,638

(22) Filed: Feb. 11, 2002

(51) Int. Cl.[7] .............................................. H04L 12/12
(52) U.S. Cl. ...................... 370/392; 370/401; 709/223
(58) Field of Search ................................ 370/229, 230, 370/230.1, 231, 235, 389, 392, 400, 401, 428; 709/212, 213, 214, 215, 216, 223, 246, 208

(56) References Cited

U.S. PATENT DOCUMENTS

| | | | | |
|---|---|---|---|---|
| 5,948,069 | A | * 9/1999 | Kitai et al. | 709/240 |
| 6,018,516 | A | 1/2000 | Packer | 370/231 |
| 6,044,468 | A | 3/2000 | Osmond | 713/201 |
| 6,091,733 | A | 7/2000 | Takagi et al. | 370/401 |
| 6,195,703 | B1 | 2/2001 | Blumenau et al. | 709/238 |
| 6,247,060 | B1 | 6/2001 | Boucher et al. | 709/238 |
| 6,298,280 | B1 | 10/2001 | Bonora et al. | 709/227 |
| 6,629,195 | B2 | * 9/2003 | Schroeder et al. | 711/108 |
| 2003/0115337 | A1 | * 6/2003 | Jayam et al. | 709/228 |
| 2003/0140124 | A1 | * 7/2003 | Burns | 709/220 |

OTHER PUBLICATIONS

Dykstra; *Gigabit Ethernet Jumbo Frames: and why you should care*; http://sd.wareonearth.com/~phil/jumbo.html (Dec. 20, 1999).

Hornig, *Network Working Group RFC: 894; DARPA Internet Program Protocol Specification* (Apr. 1984).

Information Sciences Institute, University of Southern California, *Internet Protocol RFC: 791; DARPA Internet Program Protocol Specification* (Sep. 1981).

Information Sciences Institute, University of Southern California, *Transmission Control Protocol RFC: 793; DARPA Internet Program Protocol Specification* (Sep. 1981).

Postel, *Network Working Group RFC: 879; DARPA Internet Program Protocol Specification* (Nov. 1983).

* cited by examiner

*Primary Examiner*—Chau Nguyen
*Assistant Examiner*—Duc Duong
(74) *Attorney, Agent, or Firm*—Howrey Simon Arnold & White LLP

(57) ABSTRACT

A network switch includes a first content addressable memory (CAM), a second CAM, a binding lookup table (BLT), and a packet manager. The BLT extracts two sets of header information from ingressing packets. The first set is applied the first CAM to retrieve a service policy index. The second set of header information is applied to the second CAM to determine whether a connection already exists. If a connection exists, a flow transmission control block (fTCB) pointer is retrieved from the second CAM. Otherwise, if there is no current connection for the packet, a check is made of the service policy index to determine the level of service associated with the packet. Based on the assigned service level, a new fTCB pointer is retrieved, or alternatively, client and server TCB pointers are retrieved. The packet manager then processes the packet according to which TCB pointer is retrieved.

29 Claims, 15 Drawing Sheets

BLT MANAGED POINTER
FLOW vs. CLIENT TCB

| TCB POINTER |
|---|
MSB (23) ———————— LSB (0)

FIG.2A

| ELEMENT | BITS | DESCRIPTION |
|---|---|---|
| TCB POINTER | 22 | POINTER TO A FLOW TCB OR A CLIENT TCB |
| FLOW vs. CLIENT | 1 | LOGIC 1 INDICATES FLOW TCB; LOGIC 0 INDICATES CLIENT TCB |
| BLT MANAGED POINTER | 1 | LOGIC 1 INDICATES THAT THIS POINTER IS FROM A BLT RESOURCE POOL; LOGIC 0 INDICATES THAT THIS POINTER IS A SERVER TCB (AND NEED NOT BE RECYCLED). |

FIG.2B

| 2-BIT | 22-BIT | DESCRIPTION |
|---|---|---|
| 2'h0 | ANY | RESERVED -- ILLEGAL |
| 2'h1 | ANY | SERVER TCB |
| 2'h2 | ANY | CLIENT TCB |
| 2'h3 | 22'h0 – 22'hFFFFB | FLOW TCB |
| 2'h3 | 22'h3FFFFF | RESET (RST) |
| 2'h3 | 22'h3FFFFE | DROP (DRP) |
| 2'h3 | 22'h3FFFFD | IGNORE (IGN) |
| 2'h3 | 22'h3FFFFC | FORWARD (FWD) |

FIG.2C

| TYPE OF CLIENT TO SERVER CONNECTION | POINTER USED TO REFERENCE THE CLIENT TO SWITCH TCB | POINTER USED TO REFERENCE THE SERVER TO SWITCH TCB |
|---|---|---|
| L5 | CLIENT TCB POINTER (&cTCB) | SERVER TCB POINTER (&sTCB) |
| L4 | FLOW TCB POINTER (&fTCB) | |

FIG.4

1) ClientTCBID: SELF-INDENTIFYING CLIENT POINTER NUMBER
2) ClientServerPointer: POINTER TO A LINKED SERVER TCB
3) ClientGenCount: CLIENT GENERATION COUNT
4) ClientState: STATE OF CLIENT CONNECTION
5) ClientDeferredAck: TYPE OF Ack PROCESSING REQUIRED BY CLIENT
6) ClientProtocol: IP ENCAPSULATED PROTOCOL USED BY CLIENT
7) ClientRxBuffer: SIZE OF PROXY RECEIVE BUFFER FOR CLIENT DATA
8) ClientVLANTag: VLAN TAG FROM CLIENT PACKETS
9) ClientMacAddr: MAC ADDRESS OF CLIENT
10) ClientIP: IP ADDRESS OF CLIENT
11) VipIP: VIRTUAL IP REQUESTED BY CLIENT
12) ClientWindow: TCP WINDOW FROM PROXY TO CLIENT
13) ClientMTU: TCP MTU SIZE SPECIFIED BY CLIENT
14) ClientPort: TCP OR UDP PORT ADDRESS OF CLIENT
15) VipPort: VIRTUAL PORT REQUESTED BY CLIENT
16) ClientMSS: TCP MAXIMUM SEGMENT SIZE FROM CLIENT
17) ClientLastWindow: LAST TCP WINDOW RECEIVED FROM CLIENT
18) ClientProxySequenceNumber: RECORDS THE SEQUENCE NUMBER OF THE END OF THE LAST DATA SEGMENT FORWARDED TO A SERVER IN THE CLIENT'S SEQUENCE SPACE
19) ClientInitSequenceNumber: INITIALLY RECORDS THE CLIENT'S INITIAL SEQUENCE NUMBER. SUBSEQUENTLY, THE NEXT SEQUENCE NUMBER FROM THE VIP TO THE CLIENT IS RECORDED.
20) ClientLastSequenceNumber: RECORDS THE HIGHEST ACKNOWLEDGEMENT SEQUENCE NUMBER SENT TO THE CLIENT.
21) ClientFinSequenceNumber: RECORDS THE SEQUENCE NUMBER OF A FIN TCP FLAG FROM A CLIENT
22) ClientDeltaSequenceNumber: RECORDS THE DIFFERENCE BETWEEN THE CLIENT AND SERVER SEQUENCE SPACE FOR AN CLIENT AND SERVER TCB LINKED PAIR.

FIG.12B

1) ServerTCBID: SELF-INDENTIFYING CLIENT POINTER NUMBER
2) ServerClientPointer: POINTER TO A LINKED CLIENT TCB
3) ServerGenCount: SERVER GENERATION COUNT
4) ServerState: STATE OF SERVER CONNECTION
5) ServerSSLState: CONDITIONAL STATE FLAG
6) ServerProtocol: IP ENCAPSULATED PROTOCOL USED BY SERVER
7) ServerIndex: LOAD BALANCING INDEX OF SERVER
8) ServerVLANTag: VLAN TAG FROM SERVER PACKETS
9) ServerMacAddr: MAC ADDRESS OF SERVER
10) ServerIP: IP ADDRESS OF SERVER
11) TalismanIP: EPHEMERAL IP SENT TO SERVER
12) ServerWindow: TCP WINDOW FROM SERVER TO PROXY
13) ServerMTU: TCP MTU SIZE SPECIFIED BY SERVER
14) ServerPort: TCP OR UDP PORT ADDRESS OF SERVER
15) TalismanPort: EPHEMERALI PORT SENT TO SERVER
16) ServerCSI: TCP MAXIMUM SEGMENT SIZE FROM CLIENT
17) ServerHistoryPointer: LAST TCP WINDOW RECEIVED FROM CLIENT
18) TalismanInitSequenceNumber: INITIALLY RECORDS THE EPHEMERAL PORT'S INITIAL SEQUENCE NUMBER. SUBSEQUENTLY, THE HIGHEST ACKNOWLEDGEMENT NUMBER FROM THE SERVER IS RECORDED
19) ServerLastSequenceNumber: RECORDS THE HIGHEST ACKNOWLEDGEMENT NUMBER SENT TO THE SERVER
20) ServerFinSequenceNumber: RECORDS THE SEQUENCE NUMBER OF A A FIN TCP FLAG FROM A SERVER
21) ServerDeltaSequenceNumber: RECORDS THE DIFFERENCE BETWEEN THE SERVER AND CLIENT ACKNOWLEDGEMENT SPACE FOR A CLIENT AND SERVER TCB LINKED PAIR.

METHOD AND SYSTEM FOR MANAGING TRAFFIC IN A PACKET NETWORK ENVIRONMENT

RELATED APPLICATIONS

This application is related to U.S. Provisional Application Ser. No. 60/355,922, entitled "Network Switch"; U.S. Patent Application Serial No. 10/073,483, entitled "Method Of And System For Allocating Resources To Resource Requests Based On Application Of Persistence Policies"; U.S. Patent Application Serial No. 10/074,462, entitled "Method Of And System For Allocating Resources To Resource Requests"; U.S. Patent Application Serial No. 10/073,538, entitled "Method And System For Maintaining Temporal Consistency Of Resources And Data In A Multiple-Processor Packet Switch"; U.S. Patent Application Serial No. 10/073,484, entitled "Method And System For Translating Packet Sizes In A Network"; and U.S. Patent Application Serial No. 10/098,957, entitled "Switching System." Each of the foregoing applications is filed concurrently herewith, and owned in common by the assignee hereof. Moroever, each of these applications is fully incorporated herein by reference as though set forth in full.

BACKGROUND OF THE INVENTION

1. Field of the Invention

The present invention generally relates to communication networks, and more particularly, to packet networks, and devices included therein, for carrying information between hosts such as computers.

2. Related Art

Wide Area Packet Networks typically comprise multiple local networks connected to each other through gateways, switches, routers or other similar devices. As is well known, most networked computer communication is defined with the aid of layered reference models for depicting the movement of information between host computers connected to the network. The layers in the reference models help to segregate information and network functions into manageable units. The general functions of each layer are often based on an international standard called Open System Interconnection (OSI). OSI sets forth seven processing layers through which information may pass when received by a host in order to be presentable to a non-user. Similar, transmission of information from a host to the network may pass through those seven processing layers in reverse order. Another layered reference model that is widely implemented is called TCP/IP (Transmission Control Protocol/Internet Protocol).

Packet switches are devices that are commonly found in networks. The operation of these devices can be described using layered protocol models. Generally, a network packet switch takes ingress packet traffic, classifies such traffic, performs rewrites of packet header and data information, and then forwards that traffic to another device or host on the network.

To perform network transport layer functions, some switches rely on transmission control blocks (TCBs). A TCB is a data structure that contains context information associated with a logical connection to a host. In a TCP/IP environment, a TCB includes source and destination IP address, as well as source and destination TCP ports that define the connection. It also contains information about the connection itself, such as the current send and receive sequence numbers, the first-hop MAC address, and such. A more complete definition of the TCP/IP TCB structure is given in RFC793, "Transmission Control Protocol Specification", published by the Defense Advanced Research Projects Agency, hereby incorporated by reference.

Using information contained in a TCB, a switch can process packets and manage traffic coming in and out of the switch. In known switches, TCBs are record data structures that are managed and used by software programs designed to handle and manage packet traffic. Although a software approach to transport layer functionality and TCB management has been useful in some network environments, other, hardware-based approaches can offer greater switch throughput and capacity.

SUMMARY OF THE INVENTION

It is an advantage of the present invention to provide an improved system and method for managing connections and packet traffic that allows increased throughput and capacity for a networked switch.

According to an embodiment of the invention, a system is provided for processing packet traffic in a network. The system includes a memory, a binding lookup table (BLT), a packet manager, and a transmission control block (TCB) database. The memory stores service policy indexes associated with networked hosts. Upon receiving a packet at the system, the BLT extracts header information from the packet and applies it to the memory to retrieve a service policy index corresponding to the packet. A policy manager can be included in the system to make a routing decision based on the retrieved service policy index, and instruct the packet manager how to respond to the connection. The packet manager uses the BLT index and the policy decision to provide translation or other services to the inbound packet.

According to another embodiment of the invention, a network switch is provided. The switch includes a first content addressable memory (CAM), a second CAM, a BLT, a TCB database, and a packet manager. From each packet coming into the switch, the BLT extracts two sets of header information from the ingressing packet. The first set is applied to the first CAM to retrieve an associated service policy index. The second set of header information is applied to the second CAM to determine whether a connection already exists corresponding to the packet. If a connection exists, a flow transmission control block (fTCB) pointer, a client transmission control block (cTCB) pointer or a server transmission control block (sTCB) pointer is retrieved from the second CAM. Otherwise, if there is no current connection for the packet, a check is made of the service policy index to determine the level of service associated with the packet. Based on the assigned level of service, a new fTCB pointer is retrieved from a separate memory, or alternatively, a client TCB (cTCB) pointer is retrieved. Depending on whether the packet is part of a new connection and the associated level of service, the flow TCB pointer from the second CAM, the new fTCB pointer, or the cTCB pointer is provided to the packet manager. The packet manager can then access the database and process the packet according to which TCB pointer it receives.

In accordance with a further embodiment of the invention, a method is provided for processing packet traffic in a network. In this method, networked hosts are assigned to various predetermined service levels. A memory capable of storing transmission control blocks (TCBs) is provided. The TCBs can be grouped together in the memory according to the service levels. Upon receiving a packet, header information is extracted therefrom. Based on the header information, a service level is associated with the packet. A transmission control block (TCB) in the database can then be access based on the service level associated with the packet, and the packet can be processed according to information contained in the TCB.

According to yet a further embodiment of the invention, a method is provided for processing a packet in a network switch. With this method, a five-tuple is extracted from the packet header. A three-tuple is also extracted from the header information. Next, a service index is determined, based on the three-tuple. Based on the five-tuple, a determination is made as to whether the packet is associated with an existing connection. If there is an existing connection, a previously assigned flow transmission control block (fTCB) pointer, client transmission control block (cTCB) or server transmission control block (sTCB) associated with the packet is retrieved. If there is no existing connection, a new fTCB pointer, or alternatively, a cTCB pointer is assigned to the packet. The particular TCB pointer assignment in this case is based on the service policy index. The packet is then processed as a function of the assigned TCB pointer.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 2a–c illustrate an exemplary format of transmission control block (TCB) pointers used by the system of FIG. 1.

FIG. 4 is a table showing the relationship between various types of TCB pointers and service levels.

FIGS. 12a–b illustrate an exemplary data structure for a client TCB storable in the TCB database of FIG. 1.

FIGS. 13a–b illustrate an exemplary data structure for a server TCB storable in the TCB database of FIG. 1

DETAILED DESCRIPTION

Figure 1:
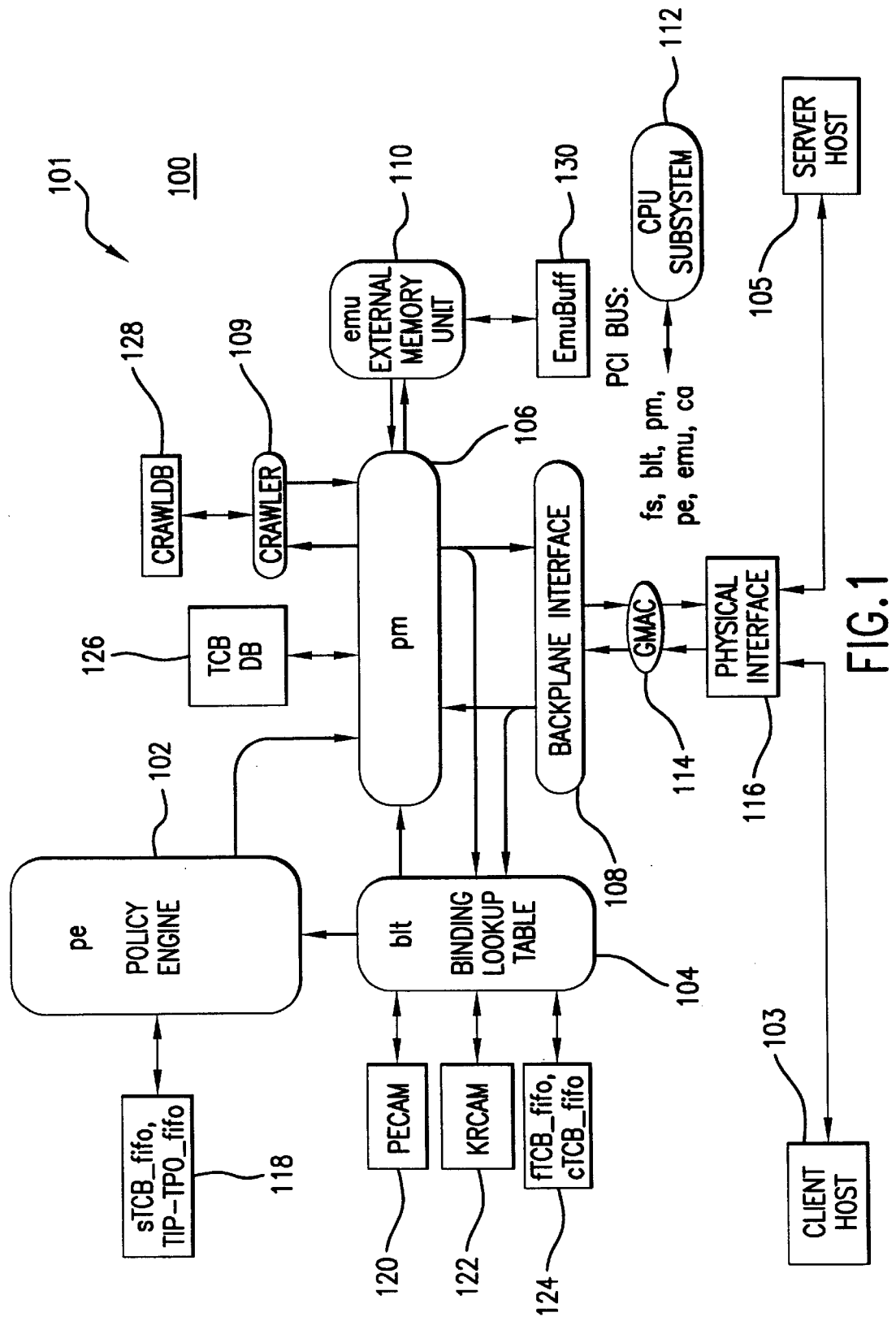
FIG. 1 is a block diagram illustrating a system in accordance with an embodiment of the present invention.

Turning now to the drawings, and in particular to FIG. 1, there is illustrated a system 100 in accordance with an exemplary embodiment of the present invention. The system 100 includes a switch 101 connected to one or more client hosts 103 and one or more server hosts 105, such as computers. The switch 101 allows the client 103 and server 105 to communicate with one another using a packet-based communication protocol, such as TCP/IP.

The switch 101 includes a policy engine (PE) 102, a binding lookup table (BLT) 104, a packet manager (PM) 106, a backplane interface 108, a crawler 109, an external memory unit (EMU) 110, a central processing unit (CPU) subsystem 112, a gigabit media access controller (GMAC) 114, and a physical interface 116. The exemplary switch 101 also includes a number of storage devices. Theses devices include one or more first-in-first-out (FIFO) memories 118 for storing transmission control block (TCB) pointers and switch internet protocol (IP) addresses (TIPs) and TCP port numbers (TPOs), a policy engine content addressable memory (PECAM) 120, a key reduction CAM (KRCAM) 122, one or more FIFOs 124 for storing flow TCB (fTCB) pointers, client (cTCB) pointers, and server (sTCB) pointers, a TCB database (DB) 126, a crawler database 128, and an EMU buffer 130.

The storage devices 118–130 are generally depicted in their preferred technologies in FIG. 1. However, alternative memory technologies, such as EEPROMs, RAMs, optical storage devices, or any other suitable storage means can be used to implement the storage devices 118–130.

The policy engine 102, BLT 104, packet manager 106, backplane interface 108, crawler 109, and EMU 110 can be implemented using any suitable combination of hardware and/or software components, and are preferably implemented in hardware using one or more field programmable gate arrays (FPGAs), such as part number EP-20K, available from Altera, Inc. However, alternative circuit technologies, such as application specific integrated circuits (ASICs) or application specific standard products (ASSPs), can be used to implement the devices.

The switch 101 architecture addresses layer 4 (L4)-layer 7 (L7) networking services, as referenced to the OSI seven layer model, such as content-enabled server load-balancing (SLB), at gigabit Ethernet media rates. While the emphasis is on content services, support is also provided for L4 (non-content) services, including SLB, at the same media rates.

The architecture operates as a reverse-proxy between clients and servers, thus it terminates both client-side and server-side TCP connections. The architecture can be implemented in the form of an intelligent processing card, which can be deployed as an appliance or as a blade in a gigabit Ethernet chassis switch (not shown).

Generally, the packet switch 101 takes ingress traffic, classifies such traffic, performs rewrites, and then forwards that traffic. Similarly, packets are directed to the switch 101 by packet filters or forwarding entries configured into a host switch (not shown) with respect to virtual IP (VIP) addresses allocated to the switch 101. Traffic from the host switch arrives at the packet switch 101, is classified according to headers and content policies, undergoes rewrites by way of header construction, and then egresses back through the host switch.

The switch 101 is configured with forwarding data so that egress server traffic can reach the appropriate physical server hosts. Console and data access can be provided through administrative serial and Ethernet ports (not shown) included in the switch 101. These can be used for configuration and status reports.

The functionality of the packet switch 101 is comprised of two partitions: a simplified TCP/IP stack for packet handling and traffic management, and a proxy service for content analysis and policy selection. This functionality can be thought of as a protocol stack and an application running over that stack.

Client traffic arriving at the TCP/IP stack is initially classified as to which service is being requested (service index) and who is making the request (client identifier). For L4 situations, these values are used directly in the proxy service for policy considerations. For L5–7 (content-enabled) services, these initial values are qualified inside the proxy service according to configured content rules, and a final set of values is computed and used for policy considerations.

The TCP/IP protocol stack functionality is comprised of the backplane interface 108 for ingress packet pre-filtering and header classification, the BLT 104 which provides a traffic stream flow table, the PM 106, which includes a TCP/IP protocol state machine and rewrite engine, the EMU 110 which provides a protocol reassembly manager and preliminary parser.

In operation, the switch 101 receives ingress traffic that is delivered from the host switch to the backplane interface, where such traffic is exposed to basic sanity checks and header classifications. Unhealthy packets are counted and dropped. When incoming traffic is destined for the switch 101 proxy functionality, it is forwarded to the PM 106 for TCP/IP protocol processing; otherwise, packets are dropped, forwarded out of the system by PM 106, or sent to the CPU 112. In transit to the PM 106, traffic headers are snooped by BLT 104 to provide needed lookup indexes, which include TCB references and service indexes. Any traffic referencing a non-content-enabled service can be signaled to the policy engine 102 as needed to get a server binding.

At the PM 106, a packet header is presented to the protocol state machine against the state given in the corresponding TCB that was identified by BLT 104. Relevant data is extracted from the packet header and applied to the TCB and then the header is stripped from the packet. A header rewrite is achieved by regenerating it on the egress side of the PM 106 from the corresponding TCB. If any content inspection is necessary, the packet body is forwarded to EMU for reassembly and eventual presentation to the proxy service; in such cases the packet body is not transmitted out to the host switch until a server binding has been made.

If a policy selection is necessary (e.g. for the head of a new traffic flow) the PM 106 is notified by the proxy service. The request to the proxy service is generated by the BLT 104 for L4 services, and the EMU 110 for L5–L7 services.

The EMU 110 reassembles a TCP data stream and determines if there is sufficient data to present to the proxy service for content analysis and policy selection. To do this it ensures that the data is contiguous and without gaps, that the start of the data is aligned with the expected TCP sequence number, and that certain keyword-value pairs (kv-pairs) are present. The EMU buffer 130 contents are presented to the policy service once required kv-pairs are present, or when the buffer 130 is completely filled. To support TCP acknowledge (ACK) generation, the EMU 110 also provides feedback to the PM 106 about gaps in the received data buffer. The proxy service partition includes the PE 102, which provides a server load-balancing policy engine and related scheduling and server tables.

The PE 102 accepts service index and client identifier values from the BLT 104 (for L4) and applies the service policies. For SLB, this involves establishing the physical server binding according to these general rules:

a) check client history for similar requests from the same client; apply any such discovered binding (for stickiness), and
b) apply scheduling rules for the appropriate server grouping to select and bind a physical server.

The PE 102 adjusts server usage counts and informs the protocol stack PM 106 of the server selection. The PM 106 can then forward the TCP data to the selected server for L4. For L5–L7, PM 106 can then forward TCP data saved in EMU 110 to the selected server.

The GMAC 114 and physical interface 116 include commercially available components for implementing media access control (MAC) and physical layer protocols, such as gigabit Ethernet, for communicating with the hosts 103, 105 over a network. Two physical interfaces can be supported. The first can be a GBIC optical 1 Gigabit interface, which connects to the physical interface 116. Alternatively, a 1000 BaseT copper interface or other transport mediums can be used. The full line rate is supported. The second interface is a backplane interface. This interface is full duplex and supports 1000 BaseT both into and out of the GMAC 114. If the packet switch 101 is deployed in a host switch then the backplane interface can be active. If the switch 101 is deployed as an appliance, then the CAT5 interface can be active.

In addition to its functions described above, the backplane interface 108 can, based on protocol, channel incoming packets to the CPU 112. During normal operation only control packets are channeled to the CPU 112. The backplane interface 108 accepts outgoing packets from the CPU 112 or from the PM 106. In addition, packets may be transferred by direct memory access (DMA) directly from the CPU 112 card memory. The backplane interface 108 also translates each packet from the internal formats used in switch 101 to the format used by the GMAC 114.

The CPU subsystem 112 can include a conventional complement of devices (CPU, RAM, ROM, Flash, etc). It communicates with the other components in the switch 101 via a PCI interface. The primary interface to the user is the RS232, which supports a user console (not shown). The CPU card handles functions such as diagnostics, health checks, configuration and initialization of the switch 101, and the like.

In accordance with an embodiment of the invention, the BLT 104 maintains a list of open connections in the KRCAM 122. The key to the CAM 122 is a five-tuple extracted from incoming IP packets. The five-tuple includes the source IP address, destination IP address, source TCP port, destination TCP port, and IP protocol field. As packets pass from the backplane interface 108 to the PM 106, they are examined by the BLT 104 and the five-tuple is extracted. The five-tuple is then applied to the KRCAM 122. If the packet five-tuple hits, i.e., refers to an existing connection, then a TCB pointer from the KRCAM 122 is passed to the PM 106 so that the corresponding TCB can be accessed in the TCB database 126 during handling of the packet. If the five-tuple misses, i.e., indicates that there is no existing connection, then policy index data and TCP SYN and ACK flags are used to determine if a connection needs to be established. TCP connections are added if a miss occurs and the SYN flag is set.

The format of the TCB pointers used in the switch 101 is shown in FIG. 2. The &TCB is a 24-bit quantity, defined by formatted fields: tag and value, as given in the example of FIG. 2a. The tag includes two bits, located in the two most significant bits of the quantity. One of the tag bits (bit 23) is used to distinguish the PE 102 managed indices (&sTCBs)

from BLT managed indices (&fTCBs and &cTCBs). The other tag bit (bit 22) is dedicated to distinguish &fTCBs from &cTCBs. This is so that BLT 104 can know how, or if it should, recycle the pointer into the appropriate resource pool when the PM 106 is tearing down a connection (doing DELETE requests).

The value field included in the exemplary &TCB of FIG. 2a is 22 bit value for the pointer, located in bits 21-0.

FIG. 2c summarizes exemplary tag and value combinations for use within the system disclosed herein.

The content of the KRCAM 122 includes fTCB, cTCB and sTCB pointers to TCB data structures, which describe the state of the connection.

If the packet passed from backplane interface 108 to the PM 106 is associated with a new connection, then there will be no entry in the KRCAM 122. In this case, the BLT 104 references the PECAM 120 with a three-tuple extracted from the packet as it passes between the PM 106 and the backplane 108. The three-tuple includes the destination IP address, destination port, and IP protocol field. The output of the PECAM 120 is a service index used to determine:

a) whether this new connection can be supported by the proxy;

b) whether the connection is requesting an L4 (non-content aware) or L5 (content aware) service; and c) which particular service is being requested by the packet.

Figure 3:
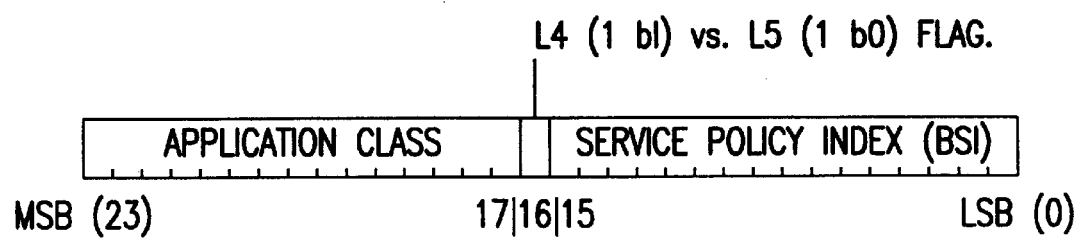
FIG. 3 is a diagram illustrating the format of service index used by the system of FIG. 1.

The format of the service indexes used by the switch 101 is shown in FIG. 3.

If the client is requesting a supported service, a new pointer to a TCB (L4 or L5) is popped off the appropriate FIFO 124 and sent to the PM 106. In the case of an L4 connection, the information about the service requested is sent to the PE 102. If the new connection is an L5 connection all information is sent to the PM 106.

The BLT 104 can also be directed by the PM 106 to add a server→client connection to the KRCAM 122. To pick up these directives, the BLT 104 snoops the bus used to send outgoing packets from the PM 106 to backplane interface 108. In this case there is no associated service information and the entry to the KRCAM 122 is a new entry.

When a connection is terminated the BLT 104 is informed by the PM 106. As with the server→client adds, these directives are snooped on the outgoing PM to backplane interface bus. When the BLT 104 is notified of a connection termination, it removes the corresponding KRCAM entry and returns the TCB pointer to the appropriate FIFO (L4 or L5), and sends delete information forward to PE 102 so that it may recover resources.

The policy engine 102 receives L4 service requests from the BLT 104. The server description and proxy TIP/TPO databases provide the five-tuple associated with the proxy to server connection (src ip, dst ip, src port, dst port, protocol). If the connection is L5, then a pointer to a server TCB (sTBC) is allocated from the sTCB FIFO 118. This points to the TCB data structure stored in the TCB database that describes the server to client connection.

FIG. 4 shows a table 400 illustrating the relationships between various types of TCB pointers and service levels. As shown, cTCB and sTCB pointers are associated with L5 services, while fTCB pointers are associated with L4 services.

Figure 5:
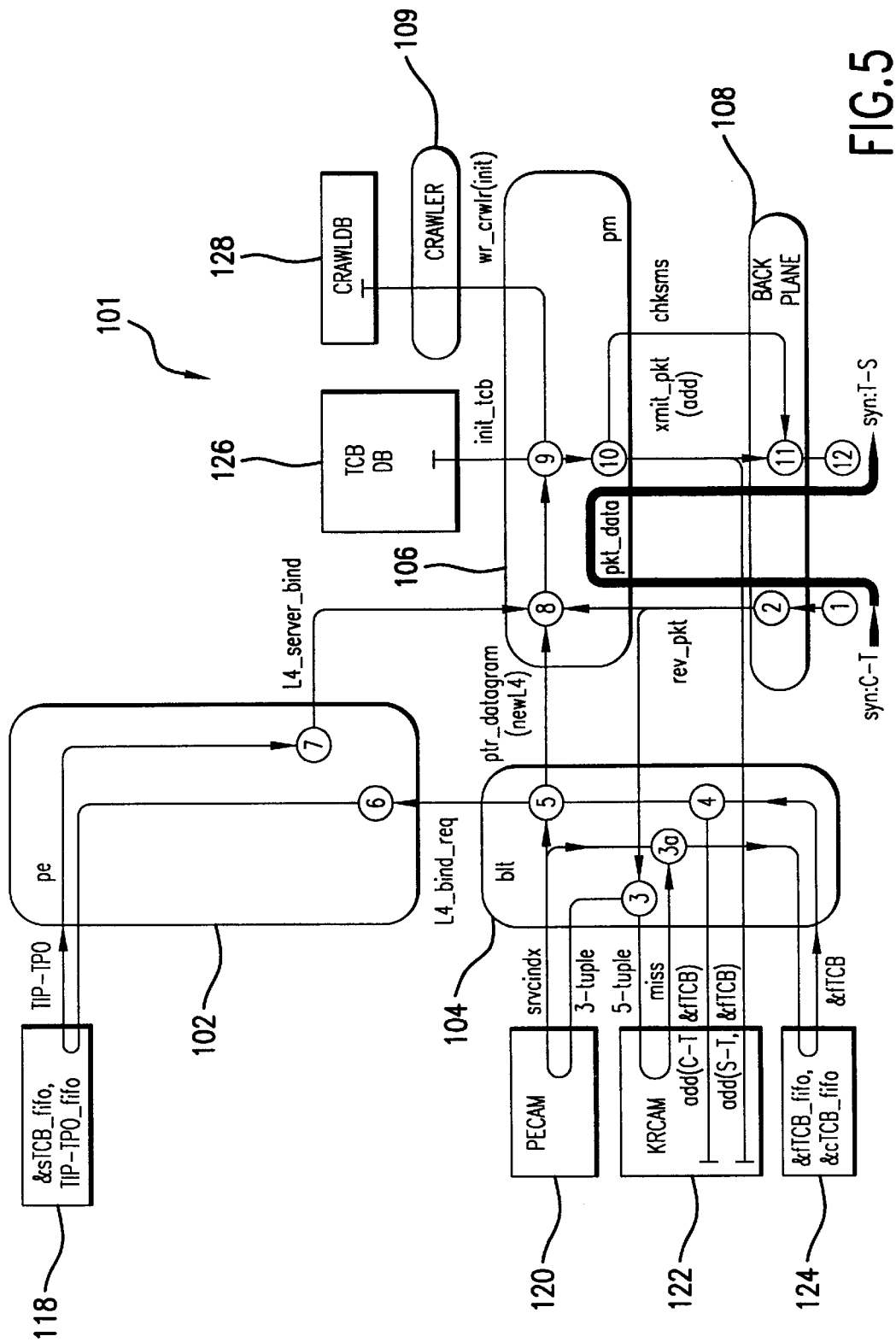
FIG. 5 is a process diagram illustrating an exemplary operation of the switch shown in FIG. 1.

FIG. 5 is a process diagram illustrating an exemplary operation of the switch shown in FIG. 1. The process flow illustrates the behavior of the switch 10 when it receives an initial TCP SYN packet for establishing a layer 4 connection. In step (1), a SYN packet arrives from a client. In step (2), the backplane interface 108 stores the entire packet and insures it has no identifiable errors before it is forwarded to the rest of the switch components. Thus, all other components can assume the packet has no checksum errors or the like.

Next, in step (3), the BLT 104 snoops the packet as it is passed to the PM 106 and extracts the header information it needs, i.e., the three-tuple and the five tuple. Then it uses the three-tuple (dest IP, dest port, protocol) to reference the PECAM 120. In this example, the requested service is supported so the PECAM 120 returns the service policy index, which includes the service index, L4 vs L5 flags and the application class. Simultaneously, the BLT 104 uses the five-tuple (src IP, dest IP, src port, dest port, protocol) to read the KRCAM 122.

In step (3a), once the PECAM 120 and KRCAM 122 have been referenced, the BLT 104 can determine whether a connection already exists for the packet and whether the service is supported. In this example, this is a new connection, so the KRCAM 122 read will miss, and from the CAM miss, the BLT 104 concludes this is a new connection only if the SYN flag is set, otherwise a drop pointer is sent to PM. In step (4), the BLT 104 uses the output of the PECAM 120 to determine that this is an L4 connection and retrieve an fTCB pointer from the fTCB FIFO 124. In addition, the pair (five-tuple, fTCB pointer) is added to the KRCAM 122.

In step (5), the fTCB pointer is then combined with the service index and a L4_bind_req including the two indexes is sent to PE 118. Also, a ptr_datagram is sent to the PM 106.

In step (6), the PE 102 performs a read of the FIFO 118 when it receives the L4_bind_req. The read is to retrieve a TIP-TPO entry for use by switch when communicating with the server. Note that the sTCB FIFO is not read because the fTCB passed from BLT 104 is used for both the client and the server.

In step (7), a server_bind(L4) message is formed by combining the TIP-TPO and a description of the allocated server. The server_bind is sent to he PM 106.

In step (8), when the PM 106 receives the rcv_pkt, it waits until the ptr_datagram(newL4) arrives from BLT 104. Because the ptr_datagram indicates this is a new L4 connection the PM 106 waits for the L4_server_bind to arrive from the PE 102.

In step (9), before forwarding the packet, the PM 106 initializes the TCB referenced by the FTCB pointer along with the corresponding crawler database entry. This initialization is for the TCB that describes the client to switch connection and the TCB that describes the server to switch connection.

In step (10), the appropriate IP and TCP header fields are regenerated and the SYN packet is sent to the backplane interface 108. The IP and TCP checksums are sent separately. The packet is tagged with a BLT add. This add describes a connection between the server IP and port (assigned by PEs allocation algorithm) and the switch IP and port taken from TIP-TPO FIFO (by PE). The protocol field of the five-tuple for the "add" connection is the same as that in the original client SYN packet. The fTCB pointer is also contained in the "add". As the packet is sent from the PM 106 to the back plane interface 108, the BLT 104 snoops the "add" instruction and stores a corresponding the entry in the KRCAM 122.

In step (12), the backplane interface 108 combines the packet with the checksums and sends it out the transmit port.

Figure 6:
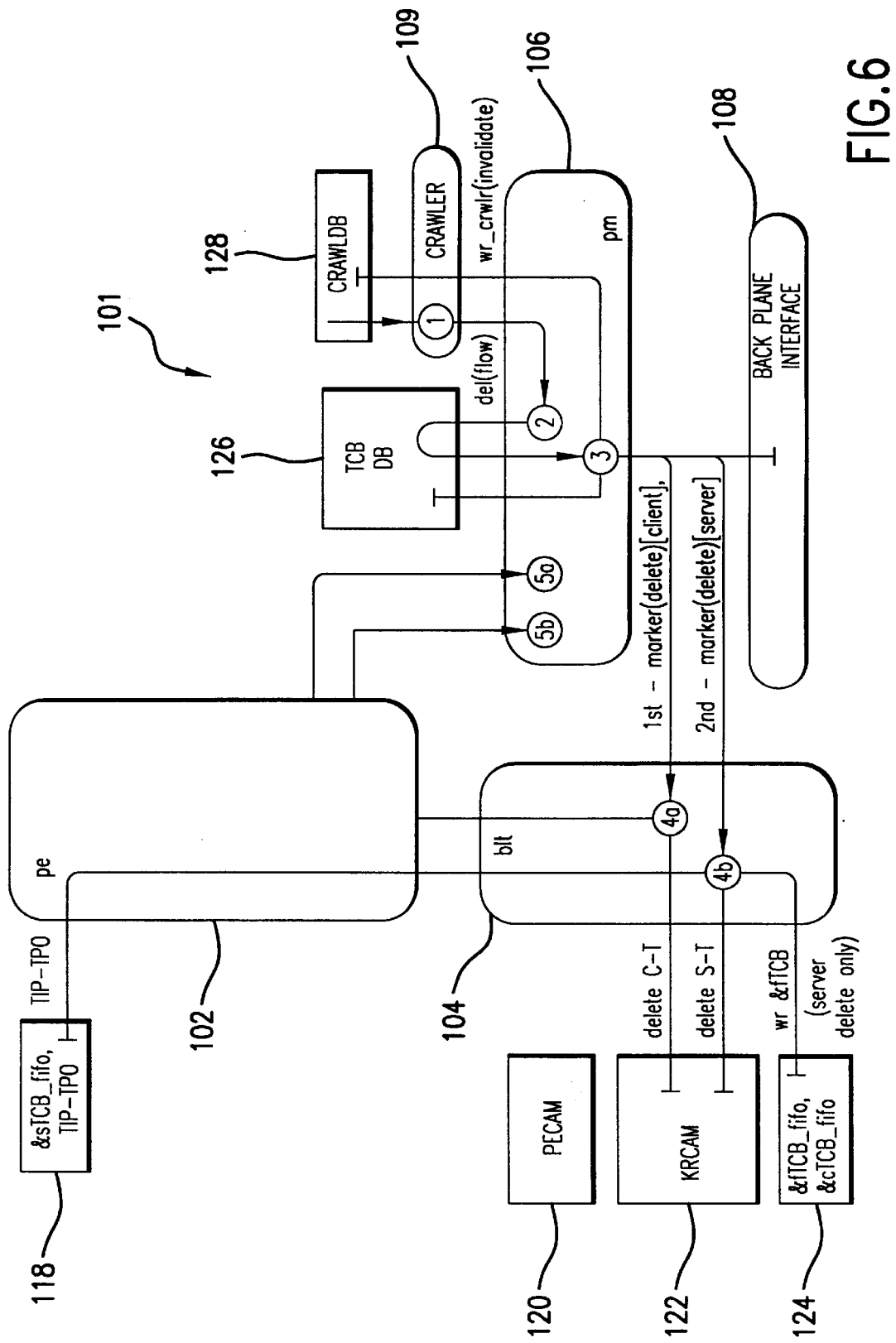
FIGS. 6–8 are process diagrams illustrating the operation of the crawler engine shown in FIG. 1.
Figure 7:
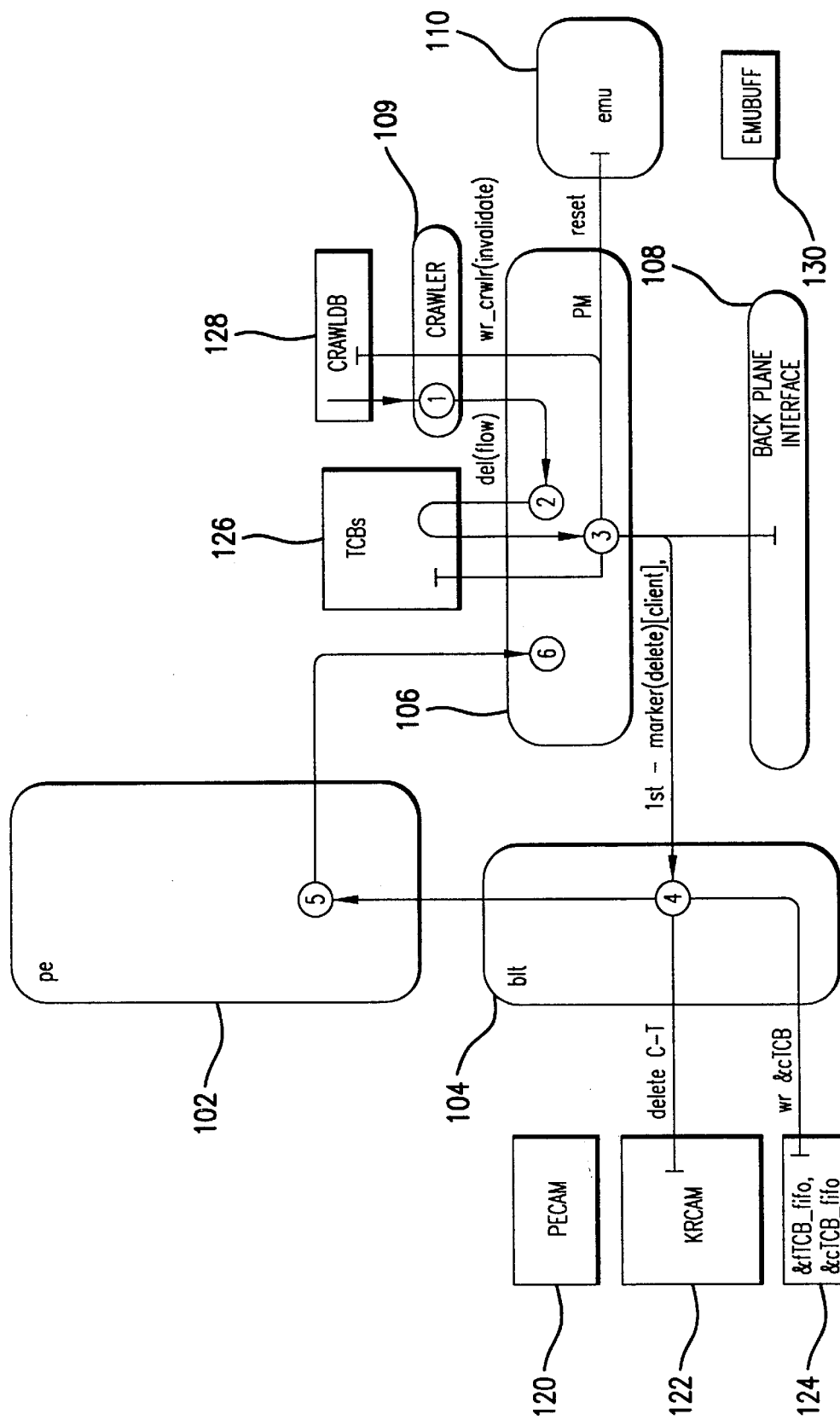
Figure 8:
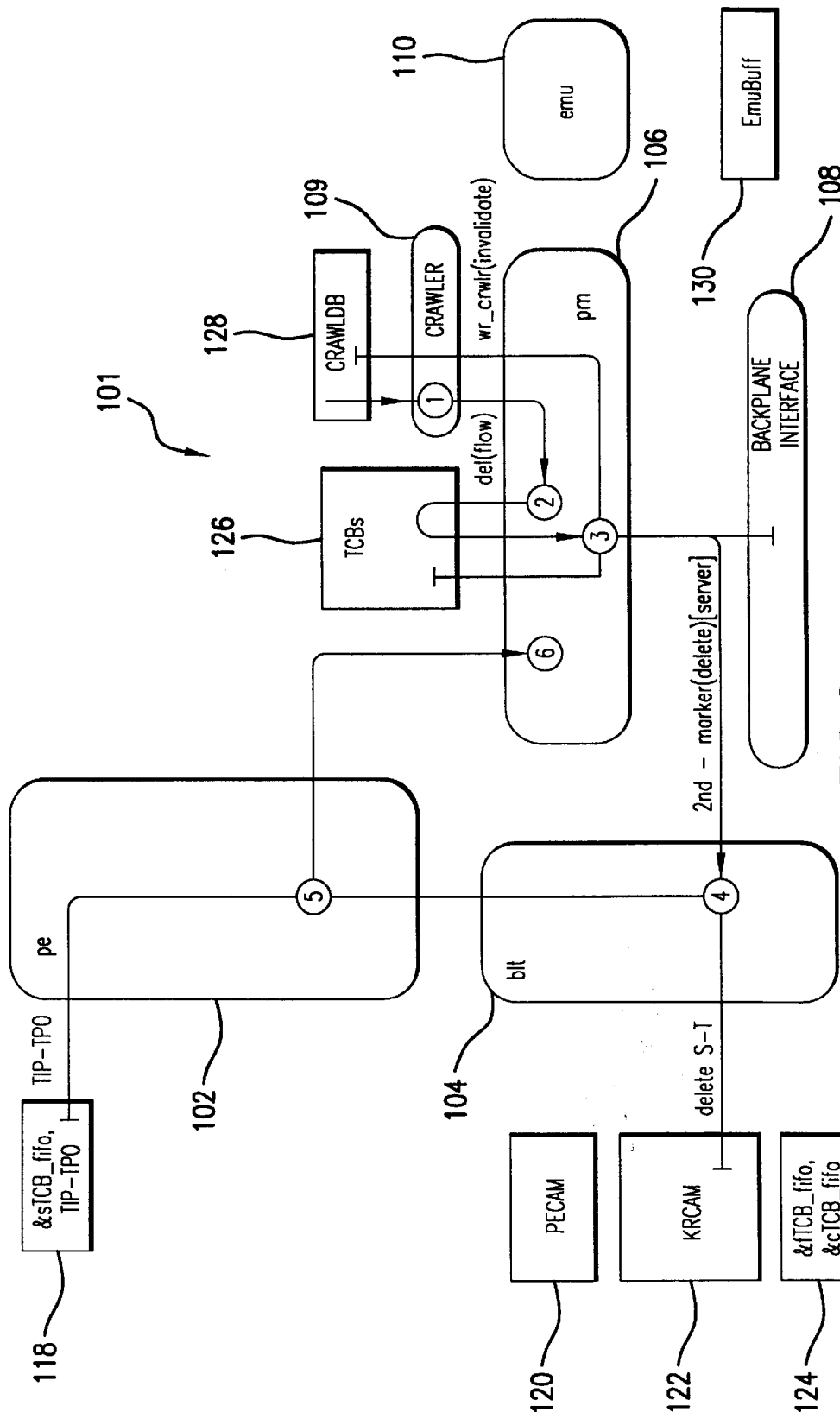

FIGS. 6–8 are process diagrams illustrating the operation of the crawler engine 109 shown in FIG. 1. The purpose of the crawler 109 is to determine whether a specified time period has elapsed since the last activity seen on a connection. An activity can include a previous timeout detected by the crawler.

To accomplish this function, there is a separate crawler entry for each server TCB and for each client TCB in the crawler database 128. A state machine/timeout engine continually walks through the crawler DB 128 and examines each crawler entry to determine whether a the timeout period has elapsed (i.e., it times out the connection).

There can be a predetermined number of timeout intervals supported by the crawler 109. These values can be stored in registers, which are set by the CPU 112 at configuration time. If a new crawler entry is updated before the timeout period expires, then the entry is overwritten and any evidence of the previous values is discarded.

There are two interfaces between the PM 106 and the crawler 109. The first is a command interface, which the PM 106 uses to directly read or write the crawler entries. This is the interface used to instruct the crawler 109 to perform its timeout function on a specific client or server TCB. The second interface is a FIFO, which the crawler 109 uses to notify the PM 106 that a specified timeout period has elapsed for a specified TCB. The commands that are accepted by the crawler 109 are shown in the table below:

| | |
|---|---|
| Init | Marks a crawler entry as valid. This command also specifies which timeout interval should be used for the timeout function. |
| Get | Returns the current contents of the crawler entry to the PM 106 via the command interface. |
| Update | The difference between an update and an init is that the crawler uses the control bits in the crawler entry (as opposed to initializing them). |
| Delete | This marks the crawler entry as invalid. When the crawler state machine next encounters this entry it will notify the PM 106 and the PM 106 will invalidate the corresponding TCB entry. |

If the crawler times out a connection, it uses the FIFO interface to send a marker to the PM 106. The marker indicates which type of timeout period was selected and which TCB timed out. However, it is possible that when the timeout is detected, the FIFO from the crawler 109 to the PM 106 is full. In this case the crawler state machine will wait until its next pass through the crawler memory 128 to deposit the timeout. State is kept in the crawler 110 to indicate that the timeout already occurred.

Anytime that an L5 packet is handled and the TCB is fetched, the corresponding crawler entry is fetched. At the same time, the crawler state machine continues to walk through memory 128. Once a crawler entry has been read by the PM 106, the crawler state machine is prevented from updating that entry and from placing any timeout indicator associated with that entry in the crawler 109 to the PM 106 FIFO. Thus, the PM 106 can know that the entry, which it read, is valid until it is written back to crawler memory. This eliminates situations involving the timeout of a connection while a packet is being handled. During this time, other crawler entries are examined and timeouts that are associated with other entries may be written to the crawler 110 and to the PM 106 FIFO.

When a TCP/IP connection terminates without protocol errors or timeouts, the switch 101 observes the following sequence: client sends a FIN to the server, and server sends a FIN to the client. Once the server sends a FIN, the TCP protocol requires that the receiving end of a connection remain open for a "waiting period" (this allows any packets remaining on the network to arrive). Therefore, packet switch 101 does not immediately delete the connections. Instead, the PM 106 updates the crawler database 128 so that the connection times out when the pre-defined "waiting period" has elapsed.

Referring to FIG. 6, after a connection is terminated, the crawler deallocates switch resources assigned to the connection. For an L4 connection, the de-allocation process takes place as follows. In step (1), the crawler 128, while scanning or walking through its database 128, determines that the "waiting period" for an L4 connection has elapsed and the associated resources should be released. It then sends a delete request to the PM 106.

In step (2), the PM 106 retrieves the corresponding TCB for the connection from the TCB database 126. This is how the fTCB pointer and two five-tuples are obtained, one for the client side and one for the server side.

In step (3), the PM 106 verifies that the connection is complete and marks the TCB as invalid. It then sends two marker (delete) packets to the BLT 104. The marker (delete) that refers to the client to switch connection is always sent first. The marker that refers to the switch to server connection follows. At the same time these markers are sent, the PM 106 invalidates the TCB and crawler entries associated with the connection.

In step (4), the BLT 104 snoops the client connection marker (delete) and extracts the five-tuple and deletes the corresponding entry in the KRCAM 122. When the BLT 104 snoops the server connection marker (delete), it once again extracts the five-tuple and deletes the corresponding entry in the KRCAM 122. However, it also recycles the fTCB pointer contained in the marker (delete) packet. BLT 104 also forwards each marker (delete) to PE 102.

When the PE 102 receives the server delete, the TIP-TPO is recycled.

In step (5), every delete received by the PE 102 is forwarded to the PM 106. This allows the PM 106 to verify that the delete was seen by both the BLT 104 and the PE 102.

Referring to FIG. 7, a process diagram is shown for reclaiming switch resources of an L5 client upon connection termination. In step (1), the crawler 110, while walking or parsing through its database 128, determines that the reclaim_now timer for a cTCB has expired. It then sends a delete request to the PM 106. If a cTCB expires, two deletes are sent, one for the client and one for the server. In the case of an sTCB expiring only the server delete is sent.

In step (2), the PM 106 retrieves the cTCB. In step (3), the PM 106 then a) invalidates the corresponding crawler entry,
b) resets the EMU buffer 130 (no more read responses to the PM 106), or
c) sends a client delete marker to the backplane interface 108.

Next, in step (4), the BLT 104 snoops the client connection marker (delete) and extracts the five-tuple and deletes the entry in the KRCAM 122. The BLT also recycles the &cTCB contained in the marker (delete) packet. The BLT 104 also forwards the marker (delete) to the PE 102.

In step (5), every delete received by the PE 102 is forwarded to the PM 106. This allows the PM 106 to verify that the delete was seen by both the BLT 104 and the PE 102.

Referring to FIG. 8, a process diagram is shown for reclaiming switch resources used by an L5 server connection. In step (1), the crawler 110, while trawling through the crawler database 128, determines that the reclaim_now timer for a sTCB has expired. It then sends a delete request to the PM 106. In step (2), the PM 106 retrieves the sTCB.

In step (3), the PM 106 then sends a server delete marker to the backplane interface 108. The PM 106 verifies that the connection is complete and marks the TCB as invalid. In step (4), the BLT 104 snoops the server connection marker (delete) and extracts the five-tuple and deletes the entry in the KRCAM 122. The backplane interface also receives markers, but discards them.

The BLT 104 also forwards the marker (delete) to the PE 102. In step (5), when PE receives the server delete the TIP-TPO is recycled.

In step (6), every delete received by the PE 102 is forwarded to the PM 106. This allows the PM 106 to verify that the delete was seen by both the BLT 104 and the PE 102.

Figure 9:
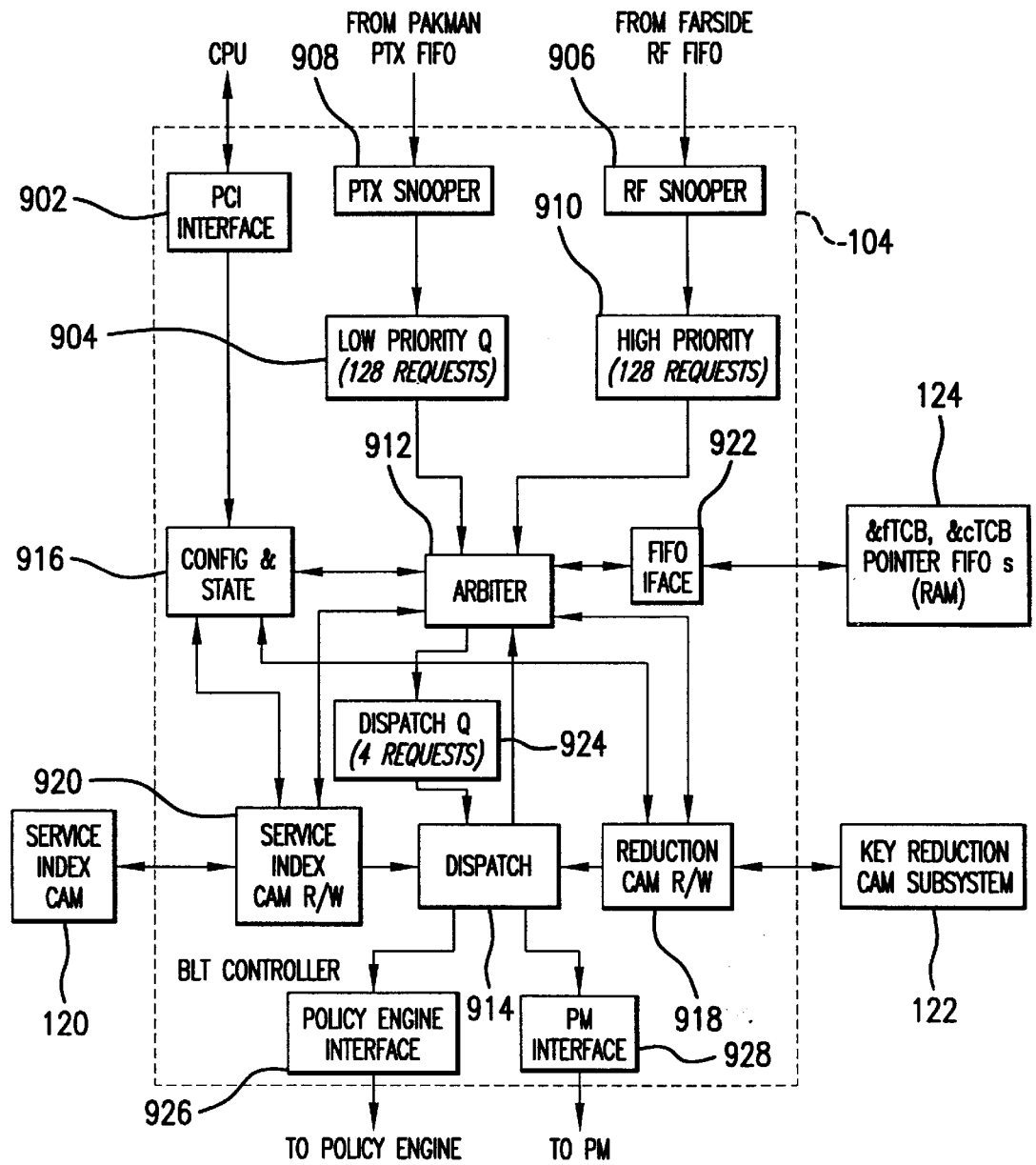
FIG. 9 is a block diagram illustrating details of the BLT of FIG. 1.

FIG. 9 is a block diagram illustrating details of the BLT 104 of FIG. 1. The BLT 104 is responsible for managing fTCB and cTCB pointers. PE 102 is responsible for managing sTCB pointers, in this example. The TCB pointers point to TCB structures that the PM 106 uses to maintain the state of each TCP connection, as well as to establish client to server bindings. Under control of the PM 106 and the backplane interface 108, pointers to these TCB structures are dynamically allocated and de-allocated by BLT 104 as the connections are opened and closed.

For client-side packets that arrive at Switch 101, the BLT 104 examines their headers for the five-tuple TCP/IP combination of ports and IP addresses. If an existing connection is identified, then the existing pointer is issued to the PM 106 for that incoming packet. If a new connection is identified, a new pointer is issued from a free list. For server-side packets, the BLT 104 maintains a database of pointers to server-side connections. This is accomplished by examining outgoing packets issued by the PM 106. The PM 106 assigns a server-side connection pointer based on data from the PE 102. Using a messaging protocol between the PM 106 and BLT 104, the new server-side connection pointers to the server TCBs are stored by BLT 104.

In addition to TCB pointer maintenance, the BLT 104 also provides one ancillary function: matching layer 4 service requests to the server farm configuration table. If a match is found, the BLT 104 issues a service index pointer to the PE 102 in parallel to the TCB pointer to the PM 106. The PE 102 performs load balancing for the service.

The BLT stores two independent types of data to expedite the operation of the PM 106 and PE 102 modules. The data stored by the BLT 104for the PM 106 are pointers to TCBs which contain control and state information about connections associated with packets. The value of a pointer is not necessarily a memory address. The pointer value may be a logical address that is further manipulated into a real memory address.

The BLT 104 monitors incoming traffic from the backplane interface 108 and extracts header information from the packet while the packet moves into temporary storage, in an RF FIFO located within the PM 106. The BLT issues pointers to the PM 106 such that the PM 106 has access to the pointers at the same time as the packet data itself. Thus, the PM 106 need not decode any of the TCP/IP packet headers to determine how to find the connection control block memory.

The data stored by the BLT 104 for the PE 102 includes service policy indices, which are pre-programmed into the BLT 104 by the CPU 112 at boot time. These indices are provided to the PE 102 to accelerate the selection of a server based on load balancing and other criteria preset in the PE 102.

The BLT 104 makes decisions regarding what pointer data to save, purge or recall based on packet traffic flowing between the backplane interface 108 (Ethernet Interface) and the PM 106. The BLT 102 commands are decoded from the traffic which flows over these interfaces. As servers and clients establish and destroy connections, their activity is recorded by the BLT 104. Additional datapaths used during normal operation are separate paths used to transfer data to the PM 106 or the PE 102.

The CPU 112 interacts with the BLT 104 via a PCI register interface 902. The CPU 112 interactions occur only during initialization or diagnostics.

The BLT 104 is able to process packets from the backplane interface 108 at line rate, and simultaneously monitor outgoing packets from the PM 106. Incoming packets are used to establish or recall BLT pointer entries while outgoing packets can establish or destroy BLT entries. Because incoming and outgoing packets may occur at the same time, up to 128 requests based on outgoing packets are stored in a queue 904 to be serviced (in the order they were received) during the time that is not required by incoming packets. Furthermore, up to 128 incoming packets will be queued up, to protect the BLT from having to drop packets due to long latency table operations.

Runtime input to the BLT 104 is derived by snooping two buses: the backplane interface 108 to RF FIFO bus for incoming packets and the PTX FIFO to the backplane interface 108 bus for outgoing packets. Traffic flows on both buses simultaneously. Both snoopers 906, 908 can be instances of the same module because their principle function is the same and because it allows diagnostics or the CPU 112 to construct requests for the rest of the system.

As packets are transferred to or from the backplane interface 108, the five-tuples, TCP flags and/or other pertinent fields are collected and are sent forward to a respective request queue 904, 910. The contents of the two request queues 904, 910 are used to drive BLT internal lookup activity. Data collected by the RF (incoming) packet snooper 906 feeds a high priority queue 910. Similarly, data collected by the PTX (outgoing) packet snooper 908 feeds the low priority queue 904. The arbiter 912 912 arbitrates between the two request queues 904, 910.

Either snooper 906, 908 can interpret two types of packets. Standard packets are the switch's 101 internal representation of external network packet traffic. Marker packets define the switch's 101 internal messaging protocol between the PM 106 and BLT 104. Thus, marker packets are ignored by the backplane interface 108 and are not put out on the external network.

In addition to the actual packet data on the RF and PTX FIFO input buses, there are sideband fields, which indicate to BLT 104 how to handle packets. In general, standard packets will appear on both the RF and PTX snooper inputs, but marker packets only appear on the PTX snooper inputs. If a marker packet does happen to appear on the RF Snooper input, it will be deconstructed and dropped into the high priority queue 910. Any packets that go by the PTX snooper 908 can only end up in the low priority queue 904; any packets that are detected by the RF snooper 906 can only create entries in the high priority queue 910.

Actual packet data payload is ignored by BLT 104. The other significant packet fields used by BLT 104 are the TCP SYN and ACK flags, set to establish a new connection, and the 104 bits of data which define a five-tuple. A five-tuple is a Client IP Address (32-bits), Client Port (16-bits), Service IP Address (32-bits), Service Port (16-bits) and Protocol (8-bits). This five-tuple uniquely identifies a TCP/IP connection, and is used as the "key" for the key reduction CAM 122 to index existing CAM entries. In addition, a three-tuple comprised of the Service IP Address (32-bits), Service Port (16-bits) and Protocol (8-bits) is used to distinguish L4 and L5 packets and to provide a service index for L4 packets.

Generally, the BLT 104 provides the following functions:
a) Distinguish L4 vs. L5 connections based on information in the service index (PE) CAM 120.
b) Allocate Pointers to TCB memory for new Layer 4 ("&fTCB") and Layer 5 ("&cTCB") traffic based on five-tuples.
c) Save five-tuple to TCB association for new L4 and L5 connections.
d) Send newly allocated L4 &fTCB to the Policy Engine
e) Identify and transmit to the PM 106 allocated TCB pointers for new and established L4 and L5 connections.
f) Save five-tuple to server TCB pointer associations ("&sTCB") as directed by transmit packets sent from the PM 106.
g) Delete TCB pointer associations as directed by the PM 106 for terminated connections and transmit delete directives to PE 102.
h) Send reserved TCB pointer values to the PM 106 to indicate that traffic is to be handled in a special way (e.g. dropped, ignored, etc.)
i) Transmit Service Index Information (along with Client IP, &cTCB and flags) to the PE 102 for Layer 4 traffic.
j) Transmit Service Index Information to the PM 106 for Layer 5 traffic.

It is the snoopers' 906, 908 function to decide what data fields of a packet are to be saved. Once the fields have been decoded by the snooper, they are combined into a single word and forwarded to one of the priority queues 904, 910. Packets coming into the system from the backplane interface 108 are high priority, and packets exiting the system as constructed by the PM 106 are low priority.

Marker packet information and standard packet information each take up one entire request queue entry. The queue entries supply the BLT internals with raw data used to manage its lookup tables, and the request queues have signals that can throttle the rest of the Switch 101 system. Data in the queue entry always includes a Command and all elements of a five-tuple. It may also include a service index, service policy, Syn/Ack/Client flags, transaction label or TCB address, depending on the type (Marker or Standard) or direction (incoming or outgoing) of the packet.

The high priority queue can buffer the information from 128 packets snooped by the RX (incoming) snooper 906. This queue depth matches the maximum number of packets that can be held in the PM 106s RF FIFO. When the queue fills its next-to-last entry, it drives the BLT "bf_full" output signal to the backplane interface 108, which warns the backplane interface 108 that any packets after the subsequent incoming packet will be missed by BLT 104. When the queue has more than one entry in it (the required number of entries can be programmable), it drives a signal to the arbiter 912 so that it can modify its priorities to prevent the system from backing up completely.

The arbiter 912 is half of the main controller for the BLT. It determines which priority queue gets access to the BLT Key Reduction CAM 112 for dynamic table management when packets are flowing through the system. The CPU 112 accesses to either CAM do not fall through the Priority queues and thus are not subject to arbiter 912 control. The arbiter 912 is also responsible for managing TCB addresses via the TCB FIFO ram subsystem 124.

The other half of the main controller for the BLT 104 is the dispatcher 914. The arbiter 912 decides which Priority queue gets to access other BLT resources, and transmits requests to those resources. The dispatch unit 912 interprets the resource responses and generates the necessary output to the PM 106 and PE 102, and also provides feedback to the arbiter 912. This feedback to the arbiter 912 determines how priority queue entries are retired from the system.

During normal operation, the CPU 112 may perform accesses to either CAM subsystem 120, 122.

There are two extra pieces of state that help the arbiter 912 make its decision between the priority queues. An "Opportunity Window" will allow a low priority queue entry to bypass partially processed high priority queue entry (partially means that a SEEK completed, but that an ADD may be pending a valid end of packet status). "Housekeeping" limits new connection establishment to increase both Queues' throughputs. The limitation prevents high priority queue entries from generating multiple (pipelined) CAM accesses without waiting for individual results.

The arbiter 912 is locked in the IDLE state until the CPU 112 writes the initialized bit of the BLT Mode register. The CPU has visibility into the arbiter 912 state via the BLT State register 916. The arbiter 912 traverses back to the IDLE state to process a new entry from the high priority queue. It does not have to traverse back to the IDLE state to process entries from the Low priority queue. The arbiter 912 detects that the high priority queue is not empty, and interprets the command while in the IDLE state. The command will cause the arbiter 912 to jump to one of its various processing states, from which it will direct other resources and wait for responses. In a normally operating system, the backplane interface 108 module only has the capability of generating two command types: NOP and IGN. The NOP command is interpreted as "SEEK for, and maybe ADD" a five-tuple association for this packet.

The arbiter 912 dispatches five-tuple SEEK requests to the Key CAM 122 through the reduction CAM interface 918, and a three-tuple requests to the Policy CAM 120 through the service index CAM interface 920 in parallel. In the simplest case, if the Key CAM SEEK fails and the Policy CAM SEEK succeeds, a subsequent ADD request on the same five-tuple is triggered. The associated value is pulled from the appropriate Flow or Client TCB FIFO 124 via the FIFO interface 922 within BLT 104. Aborted (bad) packets do not cause an ADD. Housekeeping mode may also suppress a subsequent ADD.

The IGN command is interpreted as "send the PM 106 a special TCB pointer so that it knows that it should IGNore this packet." No CAM accesses are requested.

The list of BLT actions taken based on SEEK results is described in the following paragraphs.

The BLT 104 interprets other commands, such as ADD or DELete, if they can be forced into the appropriate packet fields constructed by software and forced through the backplane interface 108.

The special 24'hFFFFFFx pointers have the following general meanings:

RST: (RESET) This pointer is sent when any packet is deemed "mid-stream" or when we are not a default gateway and the packet requests an unsupported service. "Mid-stream" packets request a supported service with an invalid collection of SYN and ACK flags to generate a Key CAM add.

DRP: (DROP) This pointer is sent during housekeeping mode to tell the PM 106 that BLT did not have time to service an otherwise valid CAM add (thus, drop the entire packet).

IGN: (IGNORE) This pointer is sent only when incoming packets are tagged as such by the backplane interface 108, for purposes BLT need not understand.

FWD: (FORWARD) This pointer is only sent when the mode[default_gateway] bit is set and the CAM seeks indicate an unsupported service. As a default gateway, we forward these packets onward, rather than resetting the connection.

The service index CAM 120 is the PECAM that maps the 56-bit VIP,VPort,Protocol three-tuple to a 24-bit service association. As shown in FIG. 3, the least significant sixteen bits are the service policy index (referred to as "BSI" or "BLT Service Index"). The 17th bit of the entry indicates whether the service policy is an L4 or L5 policy, and is used exclusively by BLT to determine the queue from which a TCB is to be allocated. The remaining higher order bits are considered to be the "Application Class", and are forwarded to the PM 106 and PE 102 along with the BSI.

The TCB for an L5 policy is a client TCB and is allocated from the &cTCB queue. If the policy is L4 then no L5 processing will take place in the rest of the system and the TCB will be allocated from the &fTCB queue. This &FTCB will be added to the Key Reduction CAM 122, and then forwarded to the PE 104 with the BSI bits of the service index from the PECAM 120. This information is used by the PE 104 to reference one of the 64,000 service policies. In addition to the service policy reference and &fTCB, the Source IP Address is also sent to the PE, which uses this information to determine how to route the packet in the switch.

The CPU 112, via it's own access port to the PECAM 120 will initialize, configure and populate appropriately formatted policy indices to support the desired configuration. The arbiter 912 performs SEEK operations on the Service Index CAM 120.

The Key Reduction CAM Subsystem 122 stores &TCB that are currently in use. These &TCB's are referenced with a key comprised of the five-tuple associated with a connection. Once a five-tuple key has been mapped to a specific &TCB the &TCB may be used by the Arbiter 912 or it may be sent to the dispatcher 914, and hence, to the PM 106.

The &cTCBs and &fTCBs which are not currently in use are stored in the two FIFOs 124. These FIFOs are pre-loaded by the CPU 112 at boot time. The number of supported Key-Address pairs in the CAM is total number of connections supported by the switch 101. In addition to the 24-bit &TCB, the FIFO RAM holds an additional 8-bit Generation Count field in the high order byte. This count is passed forward to both the PE 102 and the PM 106 for use in other blocks; it is incremented every time the &TCB is recycled back into the FIFO 124 (rolling over after 256 recycles).

When a new &cTCB or &fTCB is required, the arbiter 912 fetches it from the appropriate FIFO based on Layer 4 vs. Layer 5 nature of the Service Index, and adds a new association to the Key Reduction CAM 122. When an association between a five-tuple and a new &sTCB is needed, all of the information is sent from the PM 106.

As connections are torn down or timed out by the PM 106, the associated &TCBs are removed from the Key Reduction CAM 122. The &TCBs are recycled by putting them back into the appropriate FIFO. &sTCBs are forwarded to the PE 102, which manages the pool of available Server TCB indexes. The dispatcher queue 924 holds, as a single entry, all the data necessary to know what command the arbiter 912 has dispatched and what data may need to be fed forward to the PM or policy engine output drivers 926,928. There is space for four entries. Four entries corresponds to the number of commands that the CAMs 120,122 can buffer. The BLT dispatcher 914 interprets the results of both CAM engines 918,920 and decides what data to feed forward to the PM 106 and PE 102. It also feeds back status and free TCB pointers to the arbiter 912. The dispatcher 914 formats an output packet to the PM 106 and/or PE 102 as required, and writes the data into a FIFO transmit module, which buffers the data until the receiver is ready.

Figure 10:
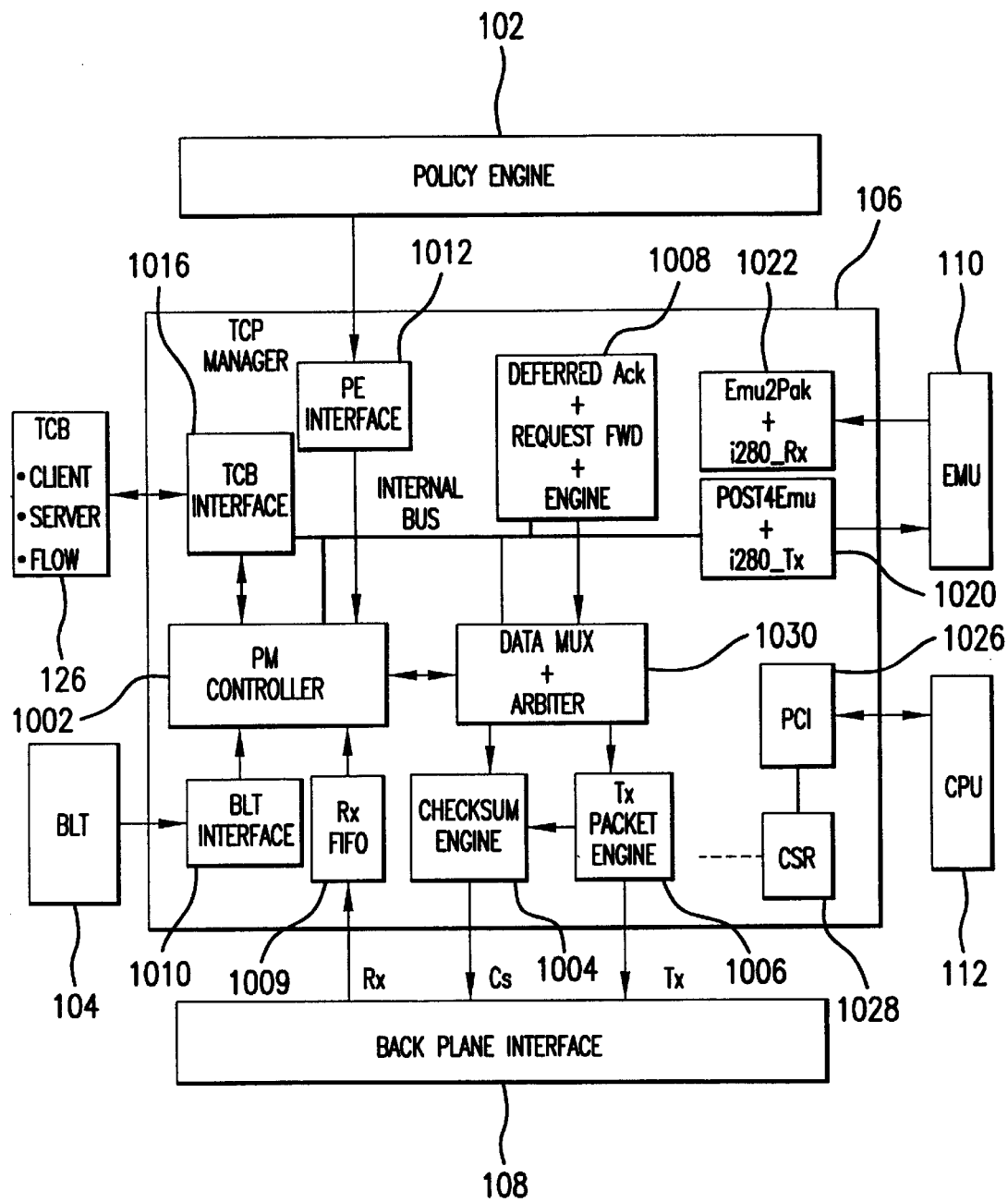
FIG. 10 is a block diagram illustrating details of the PM shown in FIG. 1.

FIG. 10 is a block diagram illustrating details of the PM 106 shown in FIG. 1. The PM controller 1002 is the thread manager for the multiple sub-engines 1004–1008 within the PM 106. The state machine within the PM 106, the controller 1002 extracts information from inbound packets in the RX FIFO 1009, the BLT interface 1010 and PE interface 1012, and spawns the multiple sub-engines threads based on the type of services to be provide for this packet. These sub-engines run in lock-in-step with the main controller 1002 acting as the TCP protocol stack and providing stack level services for layer 4 (L4) and layer 5 (L5) classified requests.

In the case of L4 traffic, the controller 1002 extracts the header information from the packet on the new connection flag and determines if sanity checking of header information with the contents of the TCB is to be done or ignored based accompanying the fTCB pointer from the BLT 104. If this is a new connection, then the controller 1002 spawns the TCB interface 1016 to create and initialize a flow TCB (fTCB). Sanity checking is aborted and waits for binding data from the PE 102.

When L4 binding data is received from the PE 102, the controller 1002 updates the fTCB and spawns the TxPacketEngine 1006. In the event a flow connection exist for this packet, the controller 1002 spawns a process to fetch the corresponding fTCB from the database 126 and sanity checks the packet with information stored in the fTCB to validate that the packet corresponds to the fTCB entry. If sanity checking is successful, the fTCB is updated via the TCB interface 1016 and the controller 1002 spawns the TxPacketEngine 1006. If the sanity checking fails, the packet is dropped and a delete FTCB entry is forwarded to the BLT 104 via the Transmit FIFO using delete marker packets.

In the case of Layer 5 traffic, the controller 102 extracts the header information from the packet and determines if sanity checking of header information against the contents of the TCB is to be done or ignored based on the new connection flag accompanying the cTCB pointer from the BLT 104. If this is a new connection then sanity checking is aborted, the controller 1002 spawns the TCB interface 1016 to create and initialize a client TCB (cTCB), the post4emu engine 1020 to initialize the corresponds receive buffer, the Tx Packet Engine 1006 to synthesize an acknowledge to the client.

In the event a client connection exists for the packet, the controller 1002 spawns the TCB interface 1016 to fetch the corresponding cTCB, and sanity checks the packet with information stored in the cTCB to validate that this packet corresponds to the cTCB entry. If sanity checking is successful the cTCB is updated via the TCB interface 1016 for inline-acking and post writes of client data into the receive buffer via the post4emu engine 1020. The Tx Packet Engine 1006 is spawned for ACKing the client.

If the cTCB indicates that the client is in deferred-ACKing mode, then only partial updates of the cTCB are done and ACK control of client data is handed over to EMU 110. If the sanity checking fails the packet is dropped and a delete cTCB entry is forwarded to the BLT via the Transmit FIFO using delete marker packets.

When the policy engine interface 1012 indicates a new layer 5 bind, the controller 1002 spawns the Tx Packet Engine 1006 for connection establishment with the server and marks the packet for BLT add using the messaging protocol. Once a connection has been established with the server, the controller 1002 requests the EMU 110 for the client data via the post4Emu engine 1020 and waits for the client data from the EMU 110. The EMU Rx interface engine 1022 indicates to the controller when client data or deferred ACK data is received from the EMU 110. The controller 1002 then spawns the Tx packet engine 1006 and the TCB interface 1016 for data forwarding and TCB updates.

Since server response data has no receive buffer associated with it, the controller 1002 spawns the Tx packet engine 1006 and TCB interface for packet re-writes and TCB updates. The mechanism for packet handling is the same as that used for Layer 4 and Layer 5.

The TCP interface 1016 is architected as a full duplex engine, where TCB entries can be fetched and updates via independent engines. The TCB interface 1016 includes arbitration so as to avoid collisions between fetches and updates and can include the snoop-based crawler engine for resource reclamation. The crawler engine is a free running engine that periodically inspects whether the TCB entries have time expired and should be reclaimed.

The BLT includes an autonomous five-tuple single pass CAM lookup that indexes into the client-server binding tables. This table index, corresponding to a new or existing connections, is forwarded to the PM 106 on every inbound packet. The BLT interface 1010 includes flow-control signaling for core logic 1002 within the PM 106 while inbound packet are being validated. The PM 106 receives from the BLT interface 1010 a service policy index, TCB pointer and flags for indexing into the corresponding bank to TCB data. The 16-bit service policy index is discarded for L4 classified traffic and posted to Memory Management Unit (EMU) 110 for L5 content analysis.

The policy engine 102 provides L4 and L5 binding services for the switch 101. Server load balancing bindings, corresponding to new L4 or L5 connections are forwarded to the PM 106 on every new request. The interface 1012 includes flow-control signaling for core logic 1002 within the PM 106, while inbound packet are being processed.

The PM 106 receives from the policy engine interface 1012 binding information for Layer 4 and Layer 5 traffic. The binding information consists of a Server bind (IP Address, Port number), switch data (IP Address, Port Number, Sequence Number), and server index. The TCB pointer accompanying the bind data indicates whether this is Layer 4 or Layer 5. The service index is a server properties handle stored in the corresponding TCB and returned the policy engine 102 when the connection or flow has been closed/terminated.

The memory management interface consists of two sub-engines 1020,1022. The PM 106 to EMU engine (post4Emu) 1020 and EMU to PM engine (EmuRxIfc) 1022 engines. These two engines are used for client data support in terms of receive buffer processing, as well as deferred-ACKing and client request forwarding.

The Tx packet engine 1006 is implemented as a store-and-forward generic IP/TCP and UDP packet formatter. The engine 1006 creates a new header and provides checksum calculations services for the packet. The Tx packet engine has the capabilities for MTU segmentation, provided the data payload is larger that the client's MTU size.

For connection management, the Tx packet engine 1006 includes all data tagging and messaging support for the BLT 104.

The receive FIFO (Rx FIFO) 109, provides temporary storage for all inbound packets. The Rx FIFO's width is 76 bits: a 64-bit data word and associated flags that indicate the start and end of the data packet. The Rx FIFO 1009 is based around an asynchronous dual port architecture, so that reads and write are independent of each other. The interface to the PM 106 provides a mechanism for confirmed write/reads and aborted writes to the FIFO. This results in a semi store-and-forward architecture, allowing the BLT 104 and the PM 106 to pre-index into the connection resources prior to the packet being validated.

Included in the PM 106, there are two FIFOs for transmit packets: the Transmit FIFO (TF) for connection establishment and request forwarding and the Checksum FIFO (CF) for IP, TCP and UDP checksums. The PM 106 uses this dual FIFO mechanism so as to support inline calculation of checksums without the need of a pre-assembly buffer.

The transmit FIFO width is 76 bits: a 64-bit data word and associated flags that indicate the start and end of the data-packet. The TF is based on an asynchronous dual-port RAM with a fall through first word architecture, such that reads and write are independent of each other. The interface to the PM 106 provides a mechanism for confirmed and aborted write, and has a store-and-forward architecture, allowing the PM 106 logic to process only completed packets.

The checksum width is 32 bits with the upper 16 being IP and lower being TCP/UDP checksums. Checksum FIFO (CF) is based on an asynchronous dual port architecture, such that reads and write are independent of each other. The interface to the PM 106 provides a mechanism for confirmed and aborted write, and has a store-and-forward architecture allowing the PM 106 logic to process only valid checksums.

Client, Server and Flow TCB resources are reclaimed by an aging mechanism. When a TCB is created or accessed, a timestamp value associated with the current time and the type of connection state is recorded in a table entry associated with the TCB pointer. The crawler engine 109 periodically walks through this table to age out entries that have not been accessed within the guard time associated with the connection state. If an entry has been aged out, it is marked for deletion and a marker packet is sent to the PE 102 via the BLT 104 to delete this client connection. In the case of the server, a connection close (FIN, RST) packet is forwarded to the server to close this connection and a marker packet is generated to the BLT 104 and PE 102 to remove this entry.

The PM 106 interfaces with the host CPU 112 through a 32 bit/50 Mhz PCI interface 1026. The PM 106 acts only as a slave device. As a slave, it decodes and responds to register access to the control status registers (CSR) 1028. In addition to the PCI 1026, the PM 106 can provide DMA requests to indicate DMA support from the CPU 112. The DMA controller of the CPU 112 is configured as a master.

Figure 11:
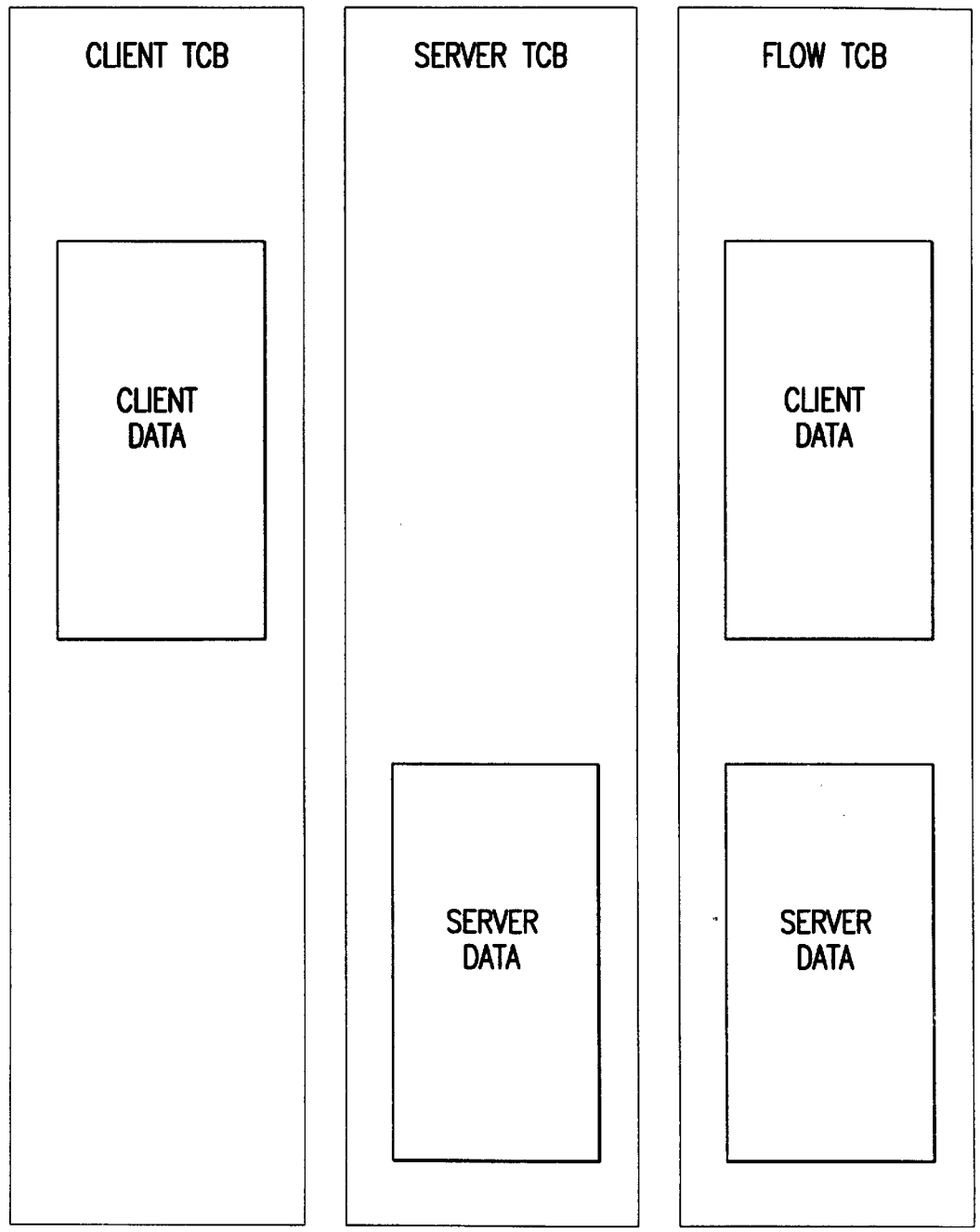
FIG. 11 is a block diagram illustrating generalized data structures for a client TCB, server TCB and flow TCB, storable in the TCB database of FIG. 1.

FIG. 11 is a block diagram illustrating generalized data structures for a client TCB, server TCB and flow TCB, storable in the TCB database of FIG. 1. The fTCB can be a 128 byte block indexed by the fTCB pointer provided by the BLT 104. It consists of client and server TCB portions. The fTCB is the active storage location for client-server flow connection data. This data is used by the TCP Manager for L4 rewrites and connection maintenance. The client and server TCBs can be 64 byte blocks. Client and server TCBs can be bound to each other. Flow TCBs are not bound to each other.

Figure 12A:
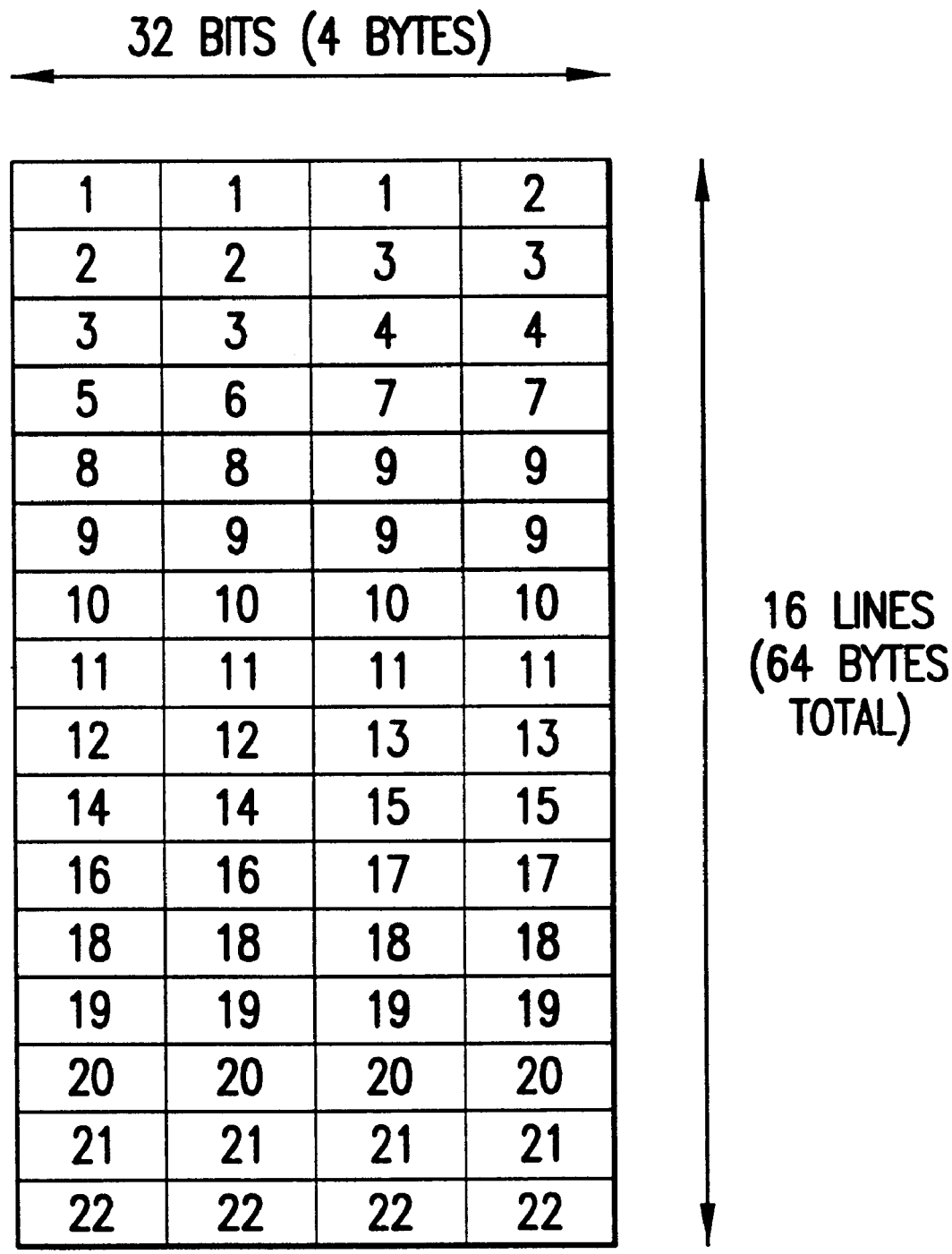

FIGS. 12a–b illustrate an exemplary data structure for a client TCB storable in the TCB database of FIG. 1. The cTCB is a 64 byte block indexed by the cTCB pointer provided by the BLT 104. The cTCB is the active storage location for client connection data. This data is used by the TCP Manager for client connection establishment and client data payload management.

Figure 13A:
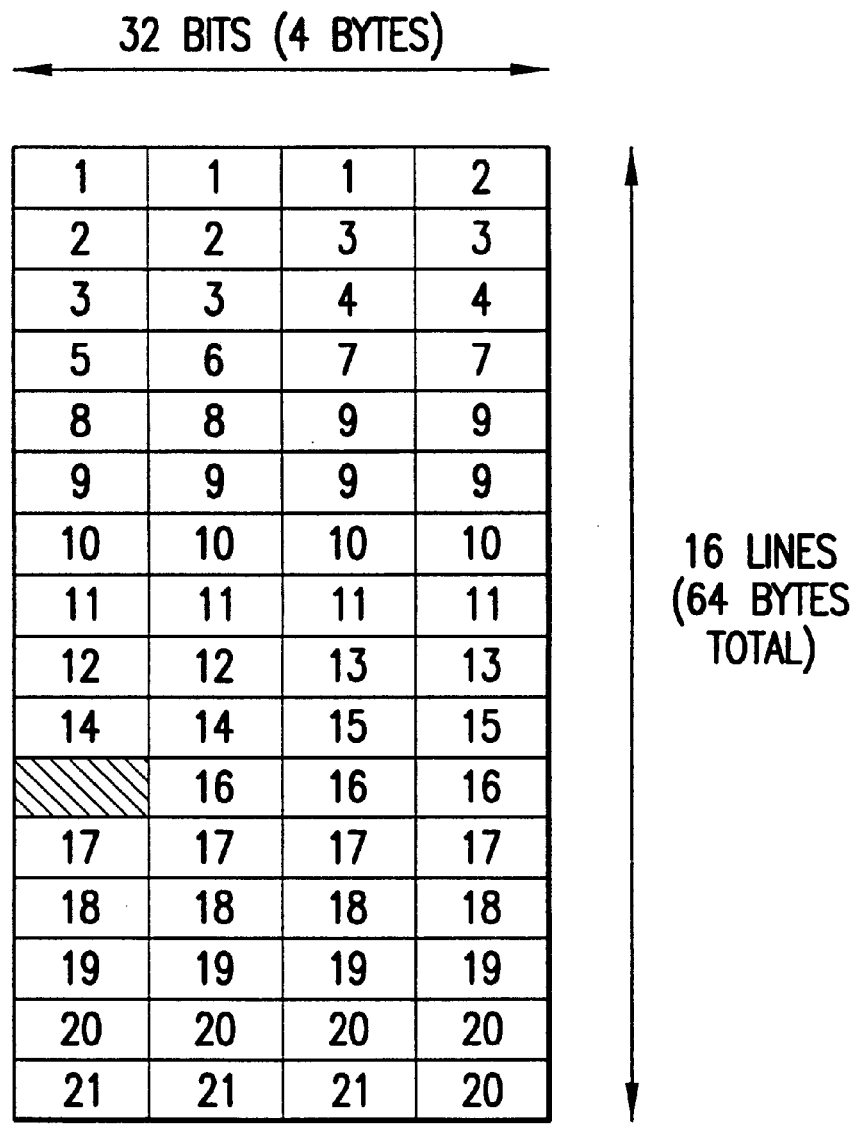

FIGS. 13a–b illustrate an exemplary data structure for a server TCB storable in the TCB database of FIG. 1. The sTCB is a 64 byte block index by the sTCB pointer provided by the BLT 104. The sTCB is the active storage location for server connection data. This data is used by the TCP Manager for server connection establishment.

According to a further aspect or the invention, a TCB pointer can include a flag for indicating that resources within the switch 101 for processing the packet are to be speculatively allocated. The flag can be appended to the TCB pointer format illustrated in FIG. 2. The PM 106 can be configured to set and release the value of this flag based on the status of a connection that has yet to be established. By indicating to the various components of the switch 101 that a connection is speculative, resources can be allocated in advance to haste the initial processing of the connect.

Another useful feature of TCB pointer assigned to a packet is that the pointer can be used as a logical address for pointing to an array of memory locations in a buffer. For instance, the TCB pointer assigned to a packet can be passed to the EMU 110 via the PM 106. The TCB pointer can then be used as a logical address to access a data array stored in the buffer 130. The EMU 110 can include a memory management unit for mapping the logical address represented by the TCB to a physical address.

While various embodiments of the invention have been described, it will be apparent to those of ordinary skill in the art that many more embodiments and implementations are possible that are within the scope of this invention.

What is claimed is:

1. A method of processing packet traffic in a network, comprising:
    assigning a plurality of hosts to a plurality of service levels;
    providing a database for storing a plurality of transmission control blocks (TCBs) grouped according to the service levels;
    extracting header information from a packet;
    determining a service level corresponding to the packet based on the header information;
    accessing a transmission control block (TCB) in the database based on the service level corresponding to the packet; and
    processing the packet according to information contained in the TCB.

2. The method of claim 1, further comprising:
    assigning a plurality of TCB indexes to each of the service levels;
    retrieving one of the TCB indexes corresponding to the service level of the packet; and
    accessing the database using the one of the TCB indexes.

3. The method of claim 2, wherein the TCB indexes include at least one index selected from the group consisting of a flow TCB index, a server TCB index, a client TCB index, and an instruction for processing the packet.

4. The method of claim 3, wherein the instruction for processing the packet is selected from the group consisting of DROP, RESET, IGNORE, and FORWARD.

5. The method of claim 2, wherein at least one of the TCB indexes includes a flag for indicating that resources for processing the packet are to be speculatively allocated.

6. The method of claim 1, wherein the header information includes a destination internet protocol (IP) address, a destination port, and an IP protocol field.

7. The method of claim 1, wherein the step of determining a service level includes:
    applying the header information to a content addressable memory (CAM) to retrieve a service policy index indicating the service level.

8. The method of claim 1, wherein the at least one of the TCBs is selected from the group consisting of a flow TCB, a server TCB, and a client TCB.

9. The method of claim 8, wherein the flow TCB includes a plurality of data fields for maintaining a connection between a client host and a server host.

10. The method of claim 8, wherein the server TCB includes a plurality of data fields for maintaining a connection to a server host.

11. The method of claim 8, wherein the client TCB includes a plurality of data fields for maintaining a connection to a client host.

12. The method of claim 1, further comprising:
    accessing the TCB in the database based on a determination of whether the packet is associated with an existing connection.

13. A method of processing a packet in a network switch, comprising:
    extracting a five-tuple from header information included in the packet;
    extracting a three-tuple from the header information;
    determining a service index based on the three-tuple
    determining whether the packet is associated with an existing connection, based on the five-tuple;
    if so, retrieving a previously assigned flow transmission control block (TCB) pointer associated with the packet;
    if not, assigning a new flow TCB pointer or a client TCB pointer and a server TCB pointer pair to the packet based on the service policy index; and
    processing the packet as a function of the previously assigned flow TCB pointer, the new flow TCB pointer, or the client and server TCB pointer pair.

14. The method of claim 13, further comprising:
    accessing a memory for storing a plurality of TCBs using a TCB pointer associated with the packet.

15. The method of claim 13, wherein a TCB pointer associated with the packet includes an instruction for processing the packet.

16. The method of claim 15, wherein the instruction for processing the packet is selected from the group consisting of DROP, RESET, IGNORE, and FORWARD.

17. The method of claim 13, wherein a TCB pointer associated with the packet includes a flag for indicating that resources within the switch for processing the packet are to be speculatively allocated.

18. The method of claim 13, wherein the step of determining a service policy index includes:
    applying the three-tuple to a first content addressable memory (CAM) to retrieve a service policy index indicating the service level.

19. The method of claim 13, further comprising:
    applying the five-tuple to a second content addressable memory (CAM);
    if a CAM miss occurs, indicating a new connection; and
    if a CAM hit occurs, retrieving the previously assigned flow TCB pointer from the CAM.

20. The method of claim 13, wherein the step of processing includes
    using the TCB pointer assigned to the packet as a logical address for pointer to an array of memory locations in a buffer.

21. A system for processing packet traffic in a network, comprising:
- a content addressable memory (CAM) for storing a plurality of service policy indexes associated with a plurality of hosts;
- a database for storing a plurality of transmission control blocks (TCBs) grouped according to a plurality of service levels;
- a binding lookup table for extracting header information from a packet and applying the extracted header information to the CAM to retrieve a service policy index corresponding to the packet; and
- a packet manager for accessing a transmission control block (TCB) in the database based on the retrieved service policy index and for processing the packet according to information contained in the TCB.

22. The system of claim 21, further comprising:
a central processing unit (CPU) configured to pre-load the plurality of service policy indexes into the CAM.

23. The system of claim 21, further comprising:
- means for assigning a plurality of TCB indexes to each of the service levels;
- means for retrieving one of the TCB indexes corresponding to the service level of the packet; and
- means for accessing the database using the one of the TCB indexes.

24. The system of claim 21, wherein a TCB pointer associated with the packet includes an instruction for processing the packet.

25. The method of claim 21, wherein the instruction for processing the packet is selected from the group consisting of DROP, RESET, IGNORE, and FORWARD.

26. A network switch for processing a packet, comprising:
- a binding lookup table for extracting a five-tuple and a three-tuple from header information included in the packet;
- a first content addressable memory (CAM), responsive to the three-tuple, for outputting a service policy index;
- a second content addressable memory (CAM), responsive to the five-tuple, for outputting a previously assigned flow transmission control block (TCB) pointer;
- means for detecting a CAM miss when applying the five-tuple to the second CAM;
- a flow TCB first-in-first-out (FIFO) memory for storing new flow TCB pointers;
- a client TCB FIFO memory for storing client TCB pointers;
- a server TCB memory for storing server TCB pointers;
- means for retrieving a new flow TCB pointer or a client TCB pointer and a server TCB pointer from the TCB FIFO memories and the server TCB memory, respectively, in the event of a CAM miss and based on the service policy index; and
- a database for storing a plurality of client TCBs, server TCBs, and flow TCBs; and
- a packet manager for accessing the database and processing the packet as a function of the previously assigned flow TCB pointer, the new flow TCB pointer, or the client and server TCB pointers.

27. The switch of claim 26, wherein a TCB pointer associated with the packet includes an instruction for processing the packet.

28. The switch of claim 27, wherein the instruction for processing the packet is selected from the group consisting of DROP, RESET, IGNORE, and FORWARD.

29. The switch of claim 26, wherein a TCB pointer associated with the packet includes a flag for indicating that resources within the switch for processing the packet are to be speculatively allocated.

* * * * *